(12) United States Patent
Belinchón Vergara et al.

(10) Patent No.: US 8,422,488 B2
(45) Date of Patent: Apr. 16, 2013

(54) REGISTRATION OF PRIVATE USER IDENTITIES AND CONTACT ADDRESSES IN AN IMS NETWORK

(75) Inventors: Maria-Carmen Belinchón Vergara, Getafe (ES); Berta Isabel Escribano Bullon, Madrid (ES); Nuria Esteban Vares, Aranjuez (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 77 days.

(21) Appl. No.: 13/001,505

(22) PCT Filed: Jun. 27, 2008

(86) PCT No.: PCT/EP2008/058267
§ 371 (c)(1),
(2), (4) Date: Mar. 29, 2011

(87) PCT Pub. No.: WO2009/155987
PCT Pub. Date: Dec. 30, 2009

(65) Prior Publication Data
US 2011/0194459 A1  Aug. 11, 2011

(51) Int. Cl.
*H04L 12/66* (2006.01)
(52) U.S. Cl.
USPC ......... 370/352; 370/328; 455/433; 455/435.1
(58) Field of Classification Search ............... 455/433, 455/435.1
See application file for complete search history.

(56) References Cited

U.S. PATENT DOCUMENTS

| 8,126,459 B2 * | 2/2012 | Myllymaki et al. ....... 455/435.1 |
| 2004/0196796 A1 | 10/2004 | Bajko et al. |
| 2005/0009520 A1 | 1/2005 | Herrero et al. |
| 2010/0008352 A1 * | 1/2010 | Przybysz et al. ............. 370/352 |
| 2011/0119359 A1 * | 5/2011 | Belinchon Vergara et al. ............................. 709/220 |
| 2011/0270995 A1 * | 11/2011 | Mutikainen et al. .......... 709/227 |

FOREIGN PATENT DOCUMENTS

FR  2 887 721  12/2006

OTHER PUBLICATIONS

3GPP TS 23.228 V7.7.0, 3rd Generation Partnership Project; Technical Specification Group Services and System Aspects; IP Multimedia Subsystem (IMS); Stage 2 (Release 7) (Mar. 2007).
3GPP TS 24.229 V7.7.0, 3rd Generation Partnership Project; Technical Specification Group Core Network and Terminals; IP Multimedia Call Control Protocol Based on Session Initiation Protocol (SIP) and Session Description Protocol (SDP); Stage 3 (Release 7) (Mar. 2007).
International Search Report for PCT/EP2008/057267, mailed Dec. 9, 2008.
International Preliminary Report on Patentability for PCT/EP2008/057267, dated Apr. 23, 2010.

* cited by examiner

*Primary Examiner* — Duc C Ho
(74) *Attorney, Agent, or Firm* — Nixon & Vanderhye, P.C.

(57) ABSTRACT

A method and a HSS server allow the implicit registration of more than one IMS Private User Identity (IMPI), or the implicit registration of more than one contact address, or both, upon explicit registration of a subscriber with a given IMPI/IMPU (IMS Public User identity) pair and a given contact address. In particular, the method includes configuring subscriber data for the subscriber at the HSS with at least one implicit registration set selected from: a set of IMPIs associated with a given IMPI or with a given IMPU, and a set of contact addresses per IMPI basis; downloading from the HSS towards the S-CSCF the implicit registration set; and building up a corresponding data model therein.

25 Claims, 14 Drawing Sheets

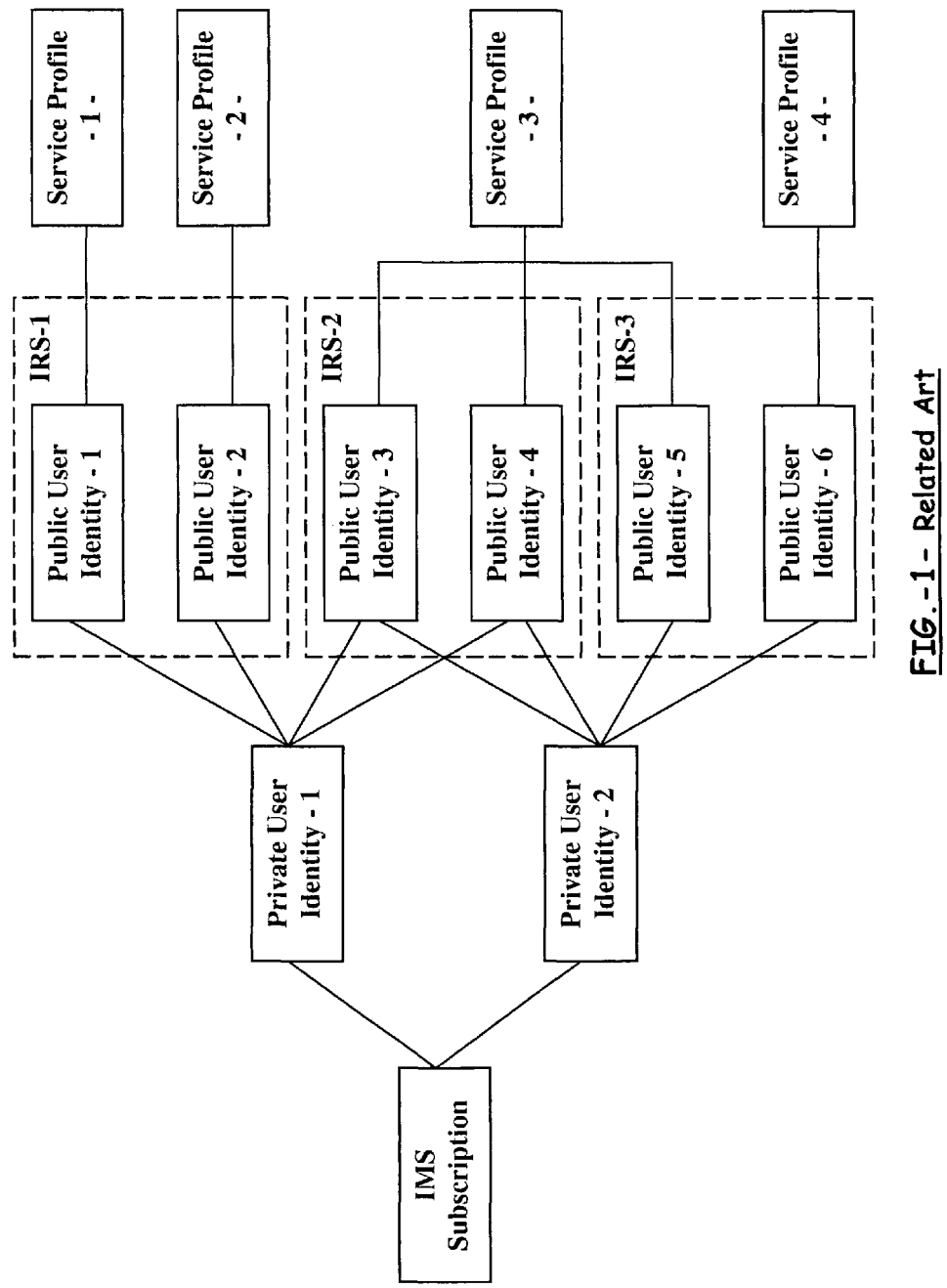
FIG. -1- Related Art

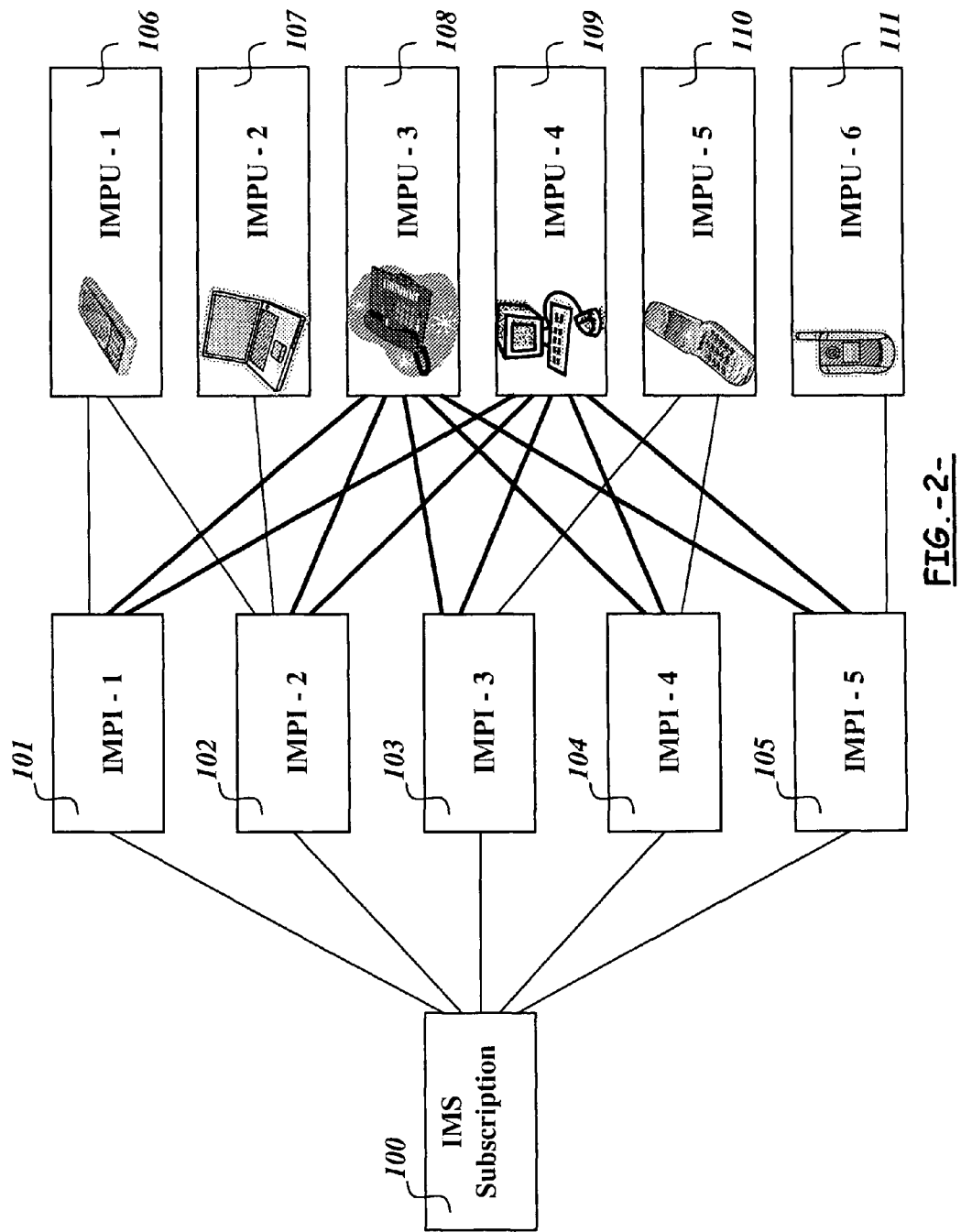
FIG. -2-

FIG. -3-

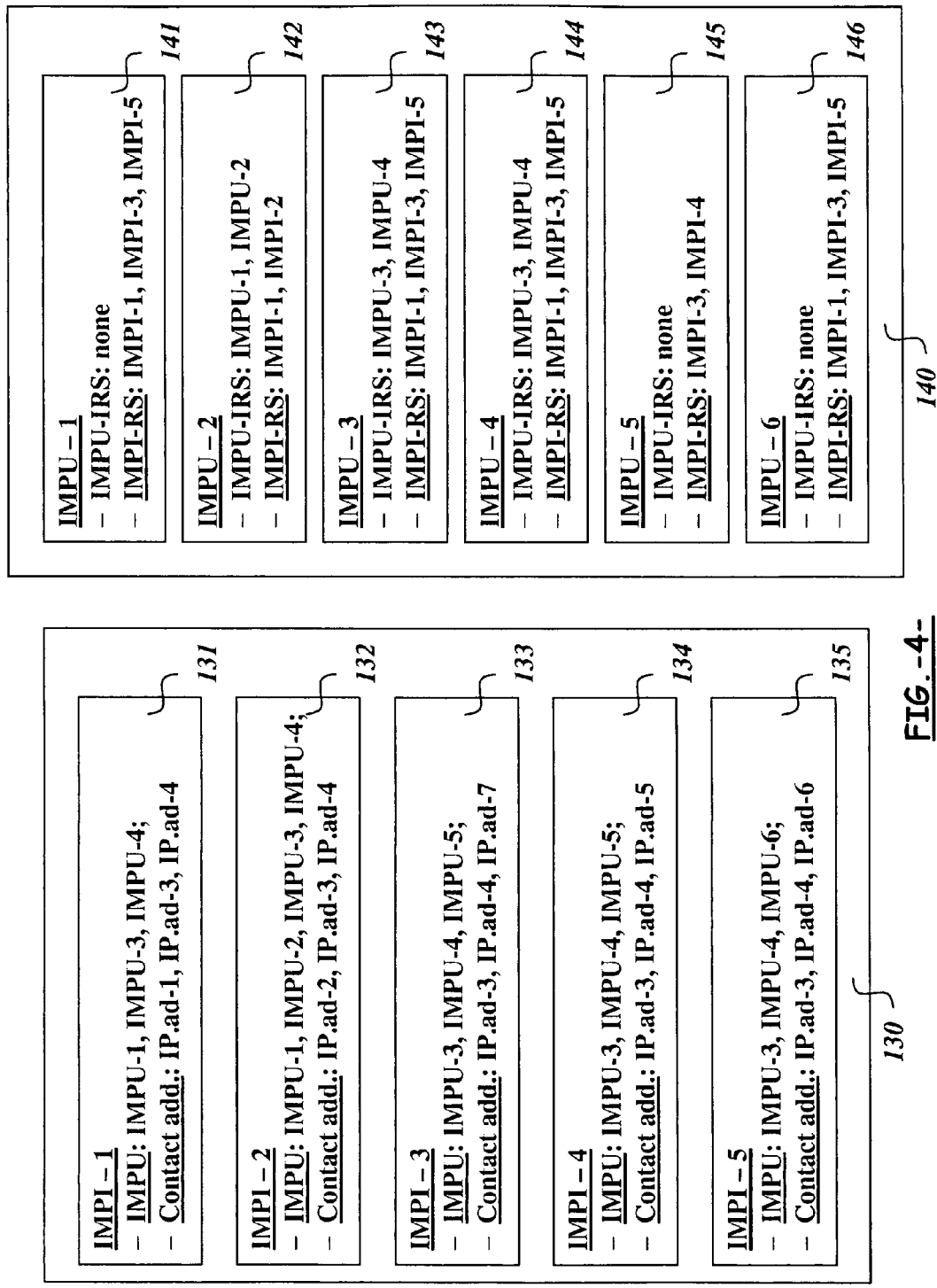
FIG. -4-

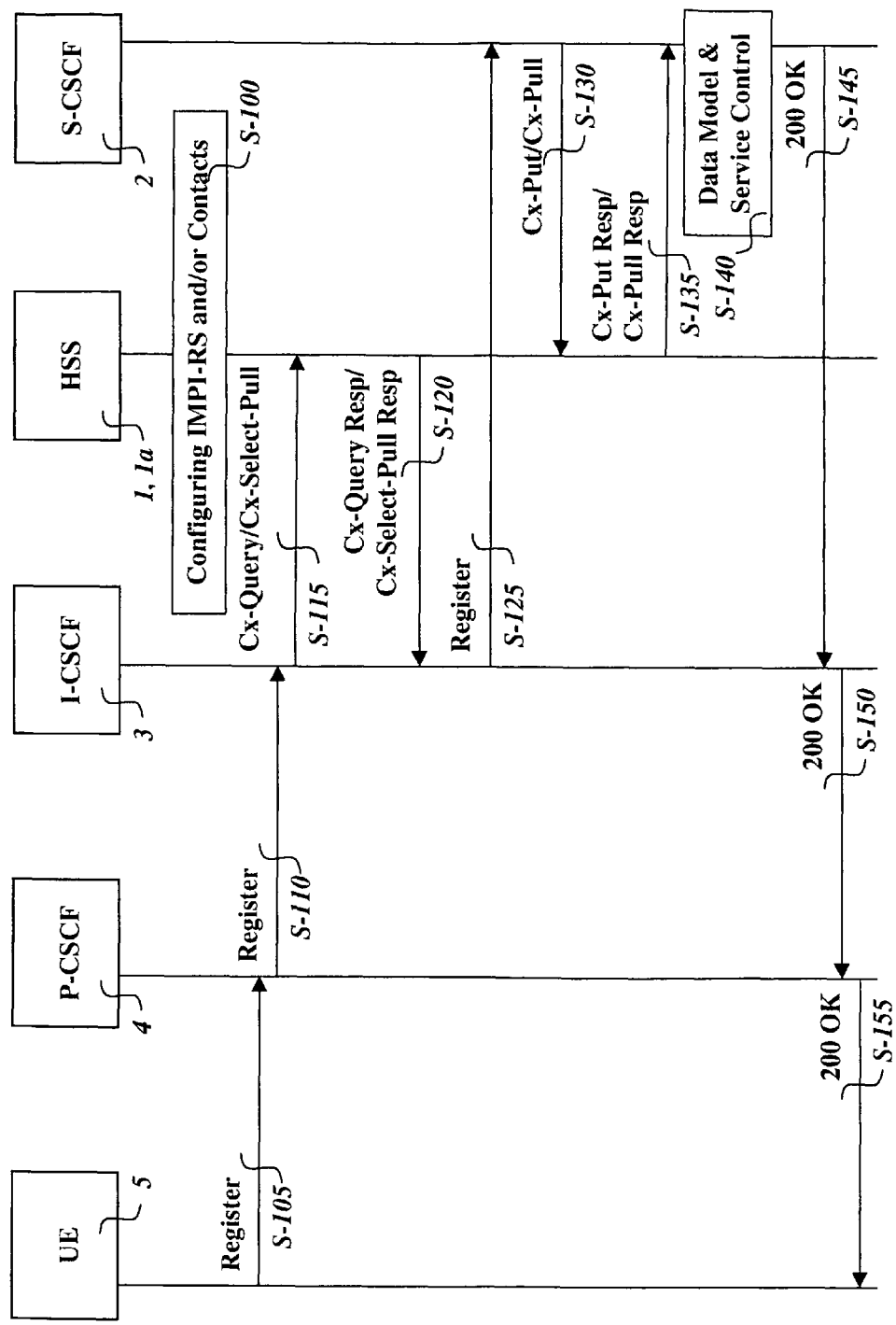
FIG. -5-

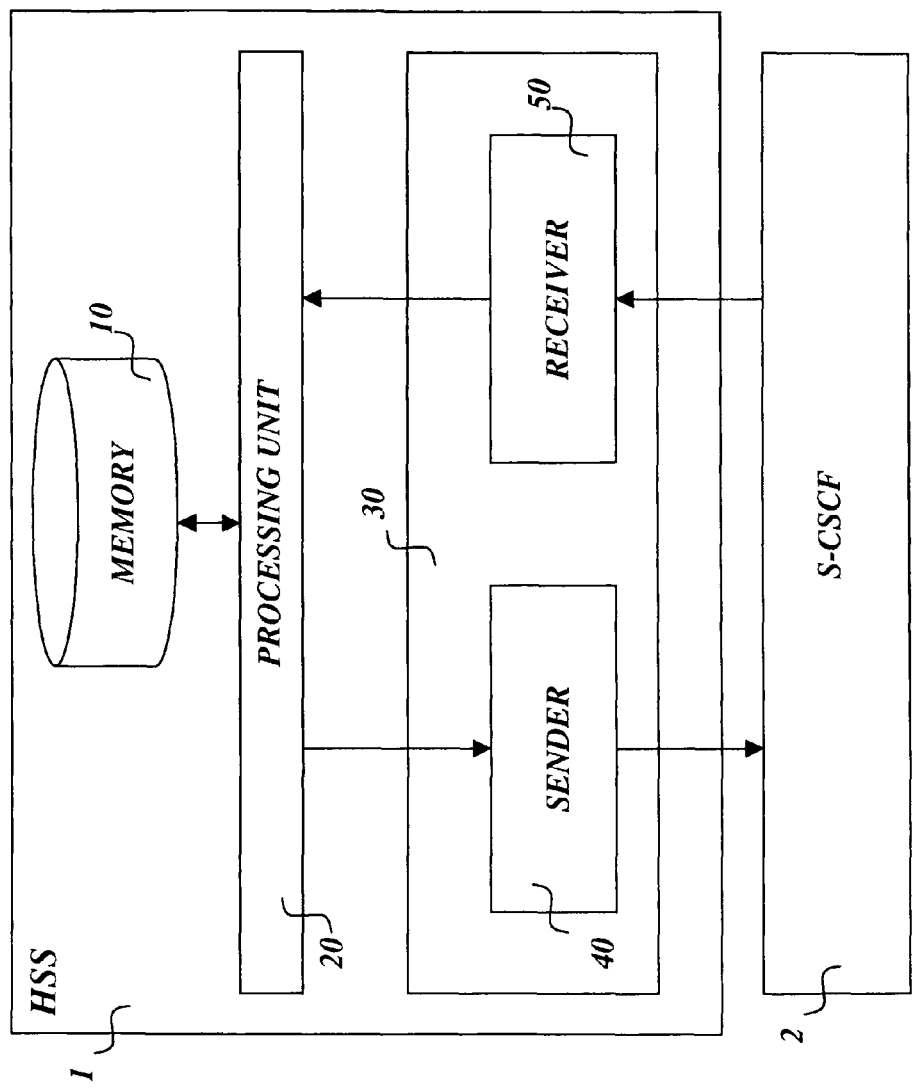
FIG.-6-

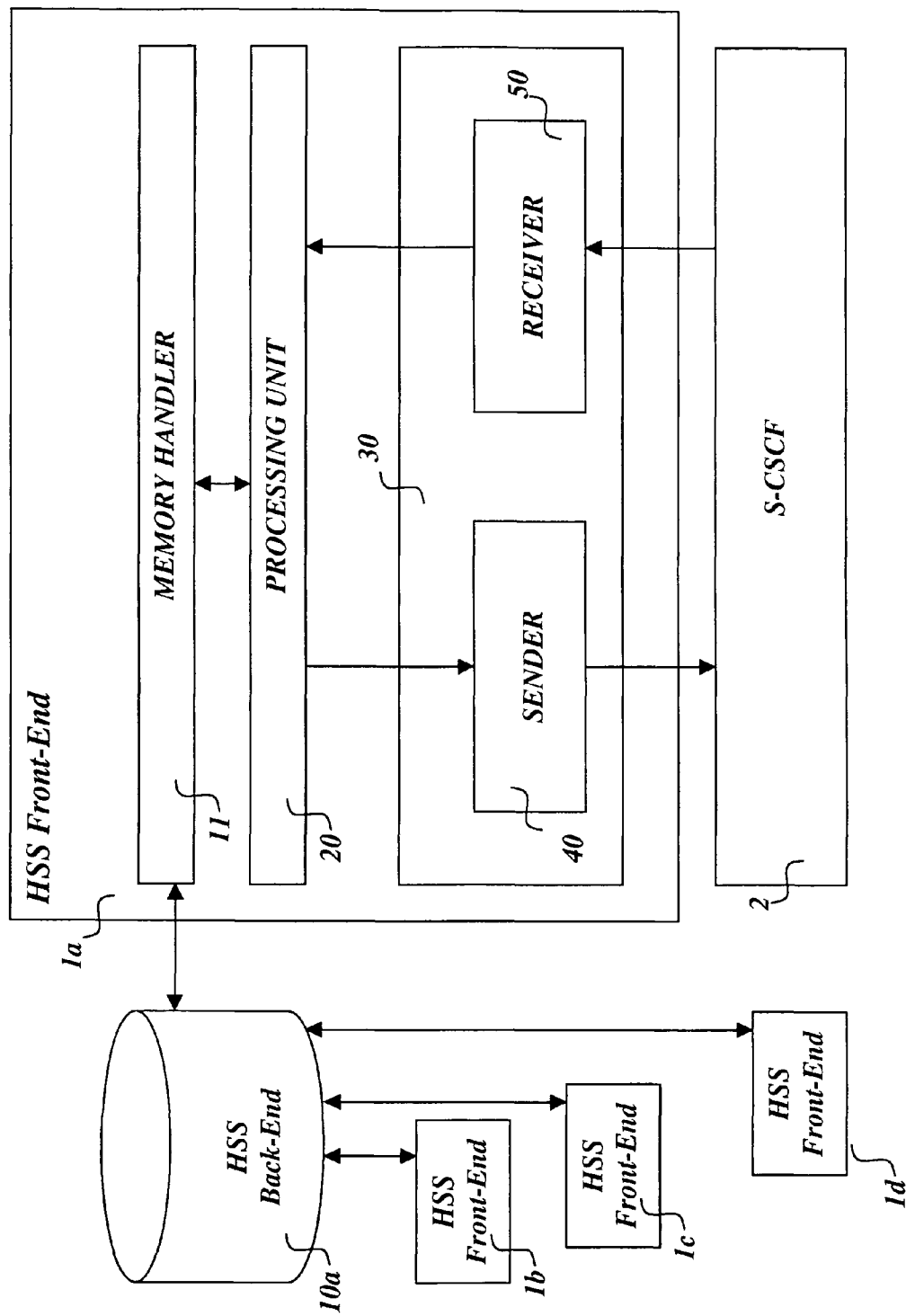
FIG. -7-

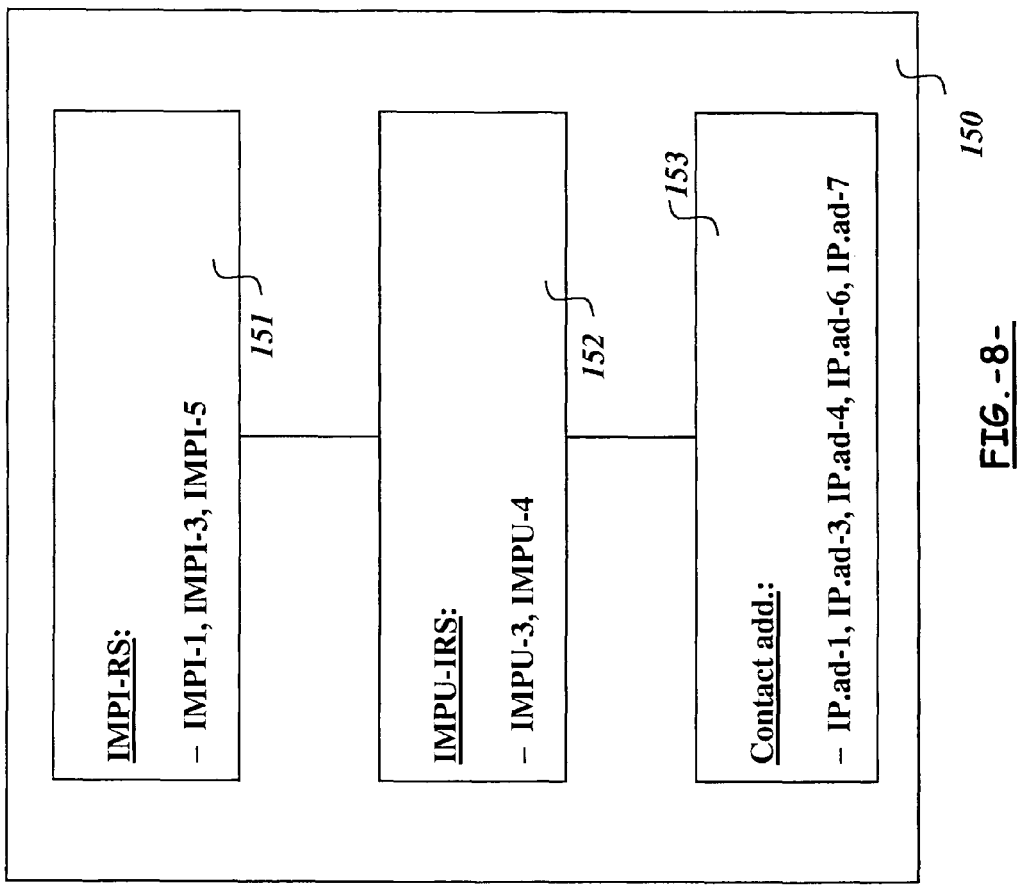
FIG. -8-

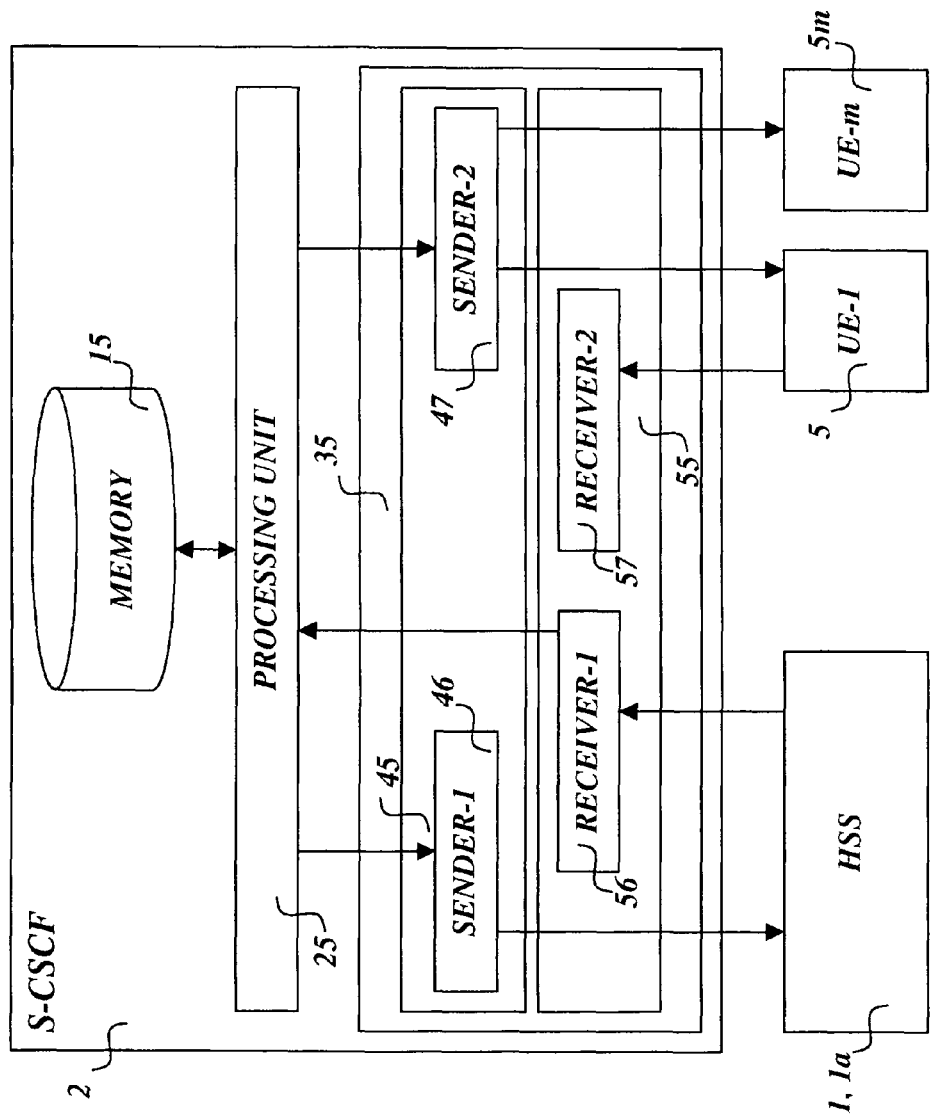
FIG.-9-

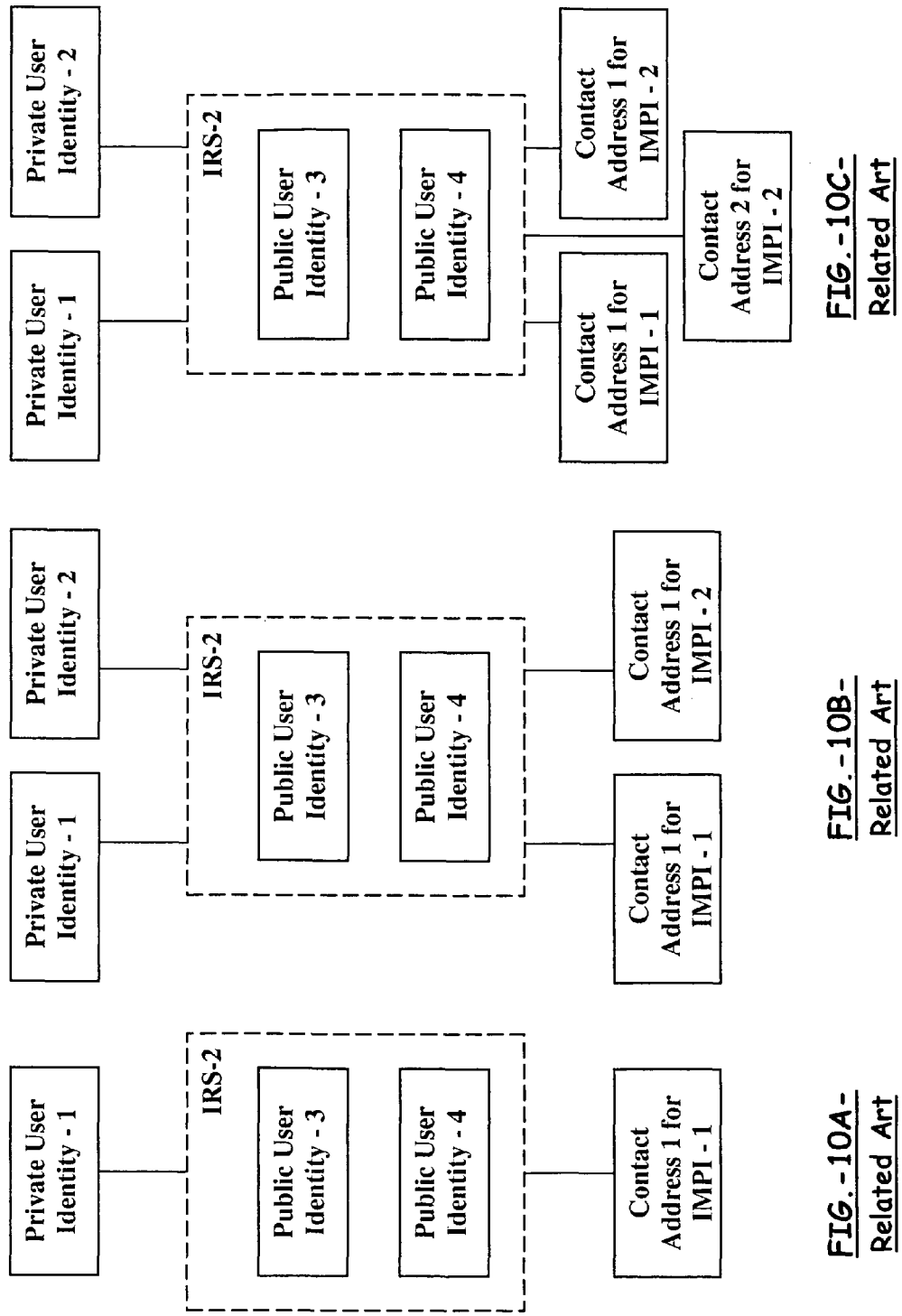
FIG.-10A- Related Art
FIG.-10B- Related Art
FIG.-10C- Related Art

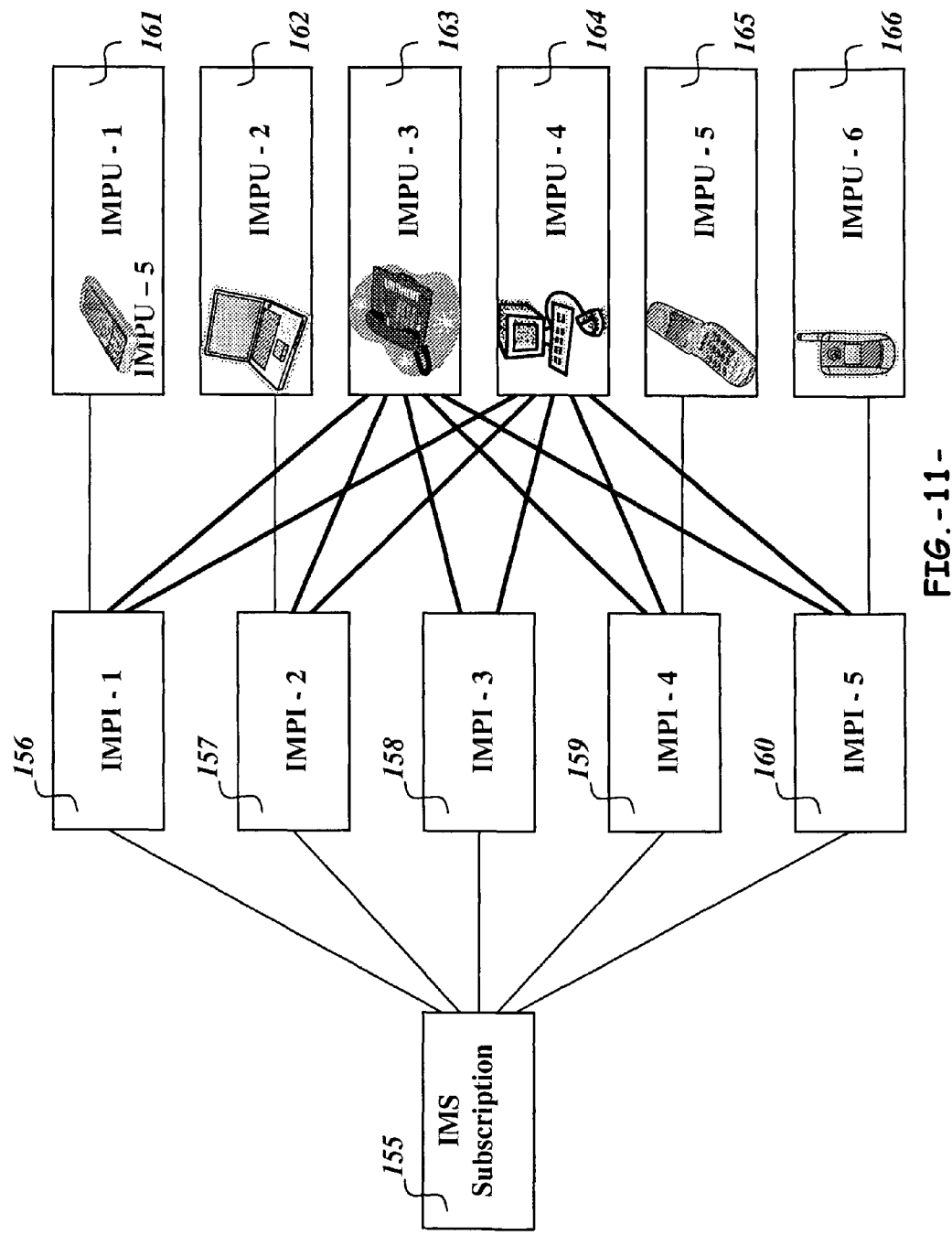
FIG. -11-

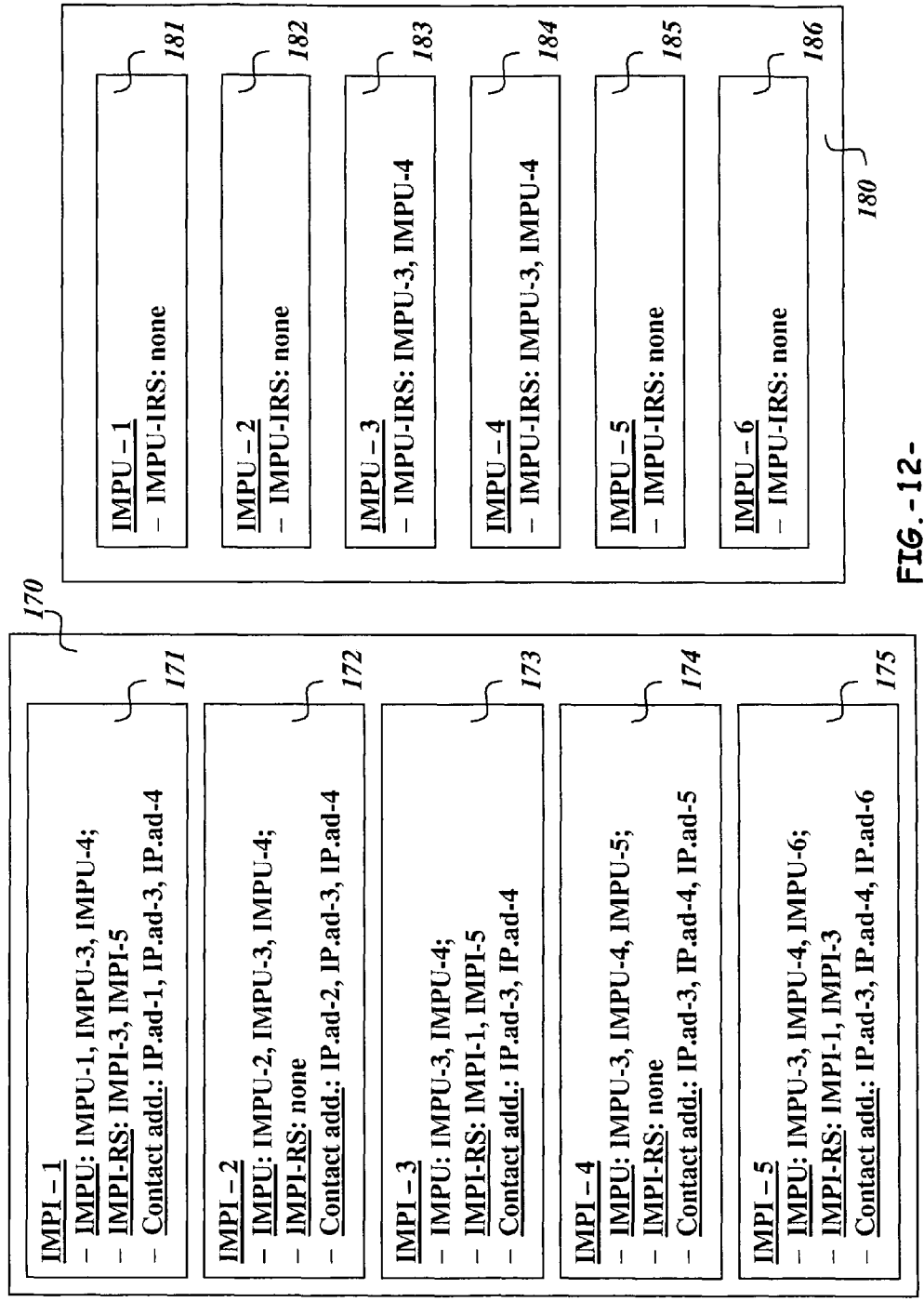
FIG.-12-

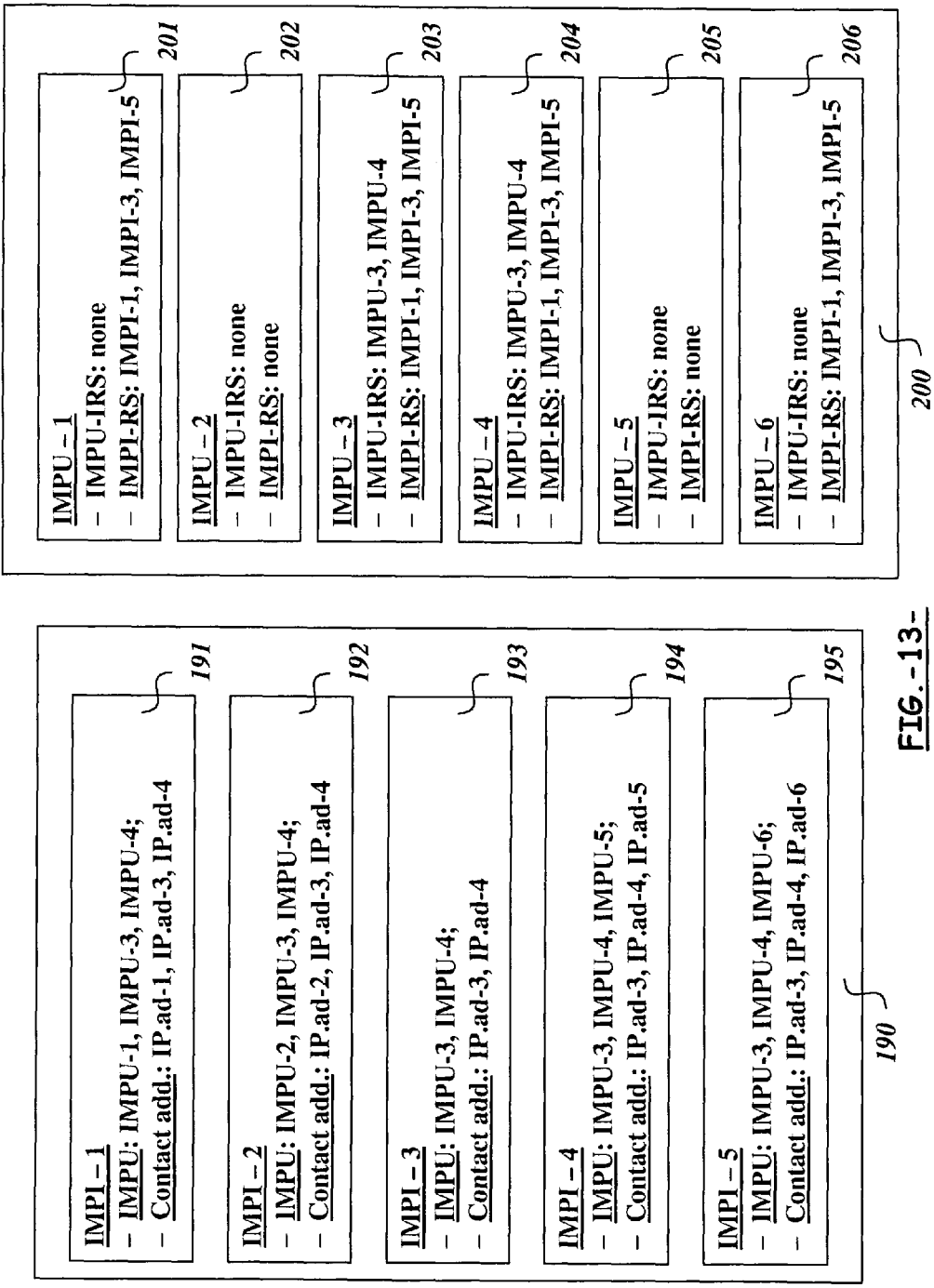

170bis

IMPI – 1
- IMPU: IMPU-1, IMPU-3, IMPU-4;
- IMPI-RS: IMPI-3, IMPI-5

*171bis*

IMPI – 2
- IMPU: IMPU-2, IMPU-3, IMPU-4;
- IMPI-RS: none

*172bis*

IMPI – 3
- IMPU: IMPU-3, IMPU-4;
- IMPI-RS: IMPI-1, IMPI-5

*173bis*

IMPI – 4
- IMPU: IMPU-3, IMPU-4, IMPU-5;
- IMPI-RS: none

*174bis*

IMPI – 5
- IMPU: IMPU-3, IMPU-4, IMPU-6;
- IMPI-RS: IMPI-1, IMPI-3

*175bis*

190bis

IMPI – 1
- IMPU: IMPU-1, IMPU-3, IMPU-4;

*191bis*

IMPI – 2
- IMPU: IMPU-2, IMPU-3, IMPU-4;

*192bis*

IMPI – 3
- IMPU: IMPU-3, IMPU-4;

*193bis*

IMPI – 4
- IMPU: IMPU-3, IMPU-4, IMPU-5;

*194bis*

IMPI – 5
- IMPU: IMPU-3, IMPU-4, IMPU-6;

*195bis*

FIG. -14-

REGISTRATION OF PRIVATE USER IDENTITIES AND CONTACT ADDRESSES IN AN IMS NETWORK

TECHNICAL FIELD

The technology disclosed herein relates to implicit registrations of subscriber identifiers and subscriber addresses upon an explicit registration of a subscriber in an IP Multimedia Subsystem with a Private User Identity and a Public User Identity identifying the subscriber. More particularly, the technology disclosed herein pertains to means and method for an implicit registration of a number of Private User Identities of a subscriber, or for an implicit registration of a number of contact addresses for the subscriber, or for both upon an explicit registration of the subscriber in an IP Multimedia Subsystem with a given Private User Identity and a given Public User Identity.

BACKGROUND

3GPP defines an IP Multimedia Subsystem and, more specifically, the IP Multimedia Core Network Subsystem to enable support for IP multimedia applications. For the sake of simplicity, and since the IP Multimedia Subsystem is defined by 3GPP as being access-independent, all references are made throughout this specification to the IP Multimedia Subsystem (hereinafter IMS).

According to 3GPP, a user may register into the IMS network or receive a terminating call to experience IMS services. To this end, such user must be given a subscription to the IMS.

A user with an IMS subscription is given one or more Private User Identities. An IMS Private User Identity (hereinafter IMPI) is assigned by the home network operator, and is used for Registration, that is, for Authorization and Authentication into the IMS network. A user may also have one or more Public User Identities. An IMS Public User identity (hereinafter IMPU) is used by any user as a user's identifier for communications with other users.

Generally speaking, any IMPU of an IMS subscription may be shared by more than one IMPI within the same IMS subscription. In particular, an IMPU may be shared amongst all the IMPIs of an IMS subscription as stated in 3GPP TS 23.228. This feature is called IMPU sharing, and such IMPU is generally known under 3GPP as a 'shared IMPU'.

In this respect, FIG. 1 illustrates an exemplary IMS subscription in accordance with 3GPP, wherein "Public User Identity—3" and "Public User Identity—4" are both shared by all the IMPIs of the IMS subscription, namely "Private User Identity—1" and "Private User Identity—2", and are thus both considered 'shared IMPUs'.

On the one hand, an IMS subscriber may register into the IMS network with an IMPI/IMPU pair selected by the IMS subscriber amongst those IMPIs and IMPUs associated in the IMS subscription of the IMS subscriber. The IMS subscriber thus registers into the IMS with a 'Register' message of a Session Initiation Protocol (hereinafter SIP), as defined by 3GPP, and including a selected IMPU/IMPI pair. Moreover, 3GPP further discloses a so-called 'implicit registration set' (hereinafter IRS) of more than one IMPU so that, where a given IMPU registered in an IMPI/IMPU pair is included in an IRS, all the IMPUs included in said IRS are considered to be registered as well.

On the other hand, 3GPP TS 24.229 Rel-7 introduces the concept of contact addresses into the IMS network. In this respect, the contact address can be defined as a SIP Uniform Resource Identifier (hereinafter a 'SIP URI') containing the IP address of the user equipment (hereinafter UE). Under certain circumstances, a contact address may also contain an instance identifier that uniquely identifies a specific UE amongst all other UEs registered with a same IMPU. For the sake of simplicity, this contact address may indistinctly be referred to as 'contact address' or simply as 'contact' throughout this specification.

A conventional registration process includes the submission of a 'SIP Register' message from the IMS subscriber towards a so-called Proxy Call Session Control Function server (hereinafter P-CSCF), which forwards such message towards an Interrogating Call Session Control Function server (hereinafter I-CSCF) of the IMS network where the destination subscriber belongs. In particular, this 'SIP Register' message includes a given IMPI/IMPU pair to be registered during this registration process, and a contact address associated with the currently used UE. The I-CSCF is in charge of selecting an appropriate Serving Call Session Control Function server (hereinafter S-CSCF) for serving the IMS subscriber, and queries a Home Subscriber Server (hereinafter HSS), which is in charge of subscription data for subscribers of the IMS network where the IMS subscriber belongs to, with the given IMPI/IMPU pair. Assuming that the IMS subscriber had not previously registered the IMPI/IMPU pair, the HSS returns the capabilities required for an S-CSCF to be assigned for serving the IMS subscriber. The I-CSCF receiving such capabilities selects an appropriate S-CSCF fulfilling the capabilities, and forwards the 'SIP Register' message with the IMPI/IMPU pair and the contact address thereto. The S-CSCF receiving the 'SIP Register' message submits its own registration towards the HSS to indicate it has been assigned for serving the subscriber identified by the IMPI/IMPU pair. The HSS then changes the status of said IMPI and IMPU from 'not registered' to 'registered', it stores a reference to the S-CSCF as being assigned for serving the IMS subscriber, and it downloads a user profile associated to said IMPU towards the S-CSCF. The S-CSCF receiving the user profile for the IMS subscriber and already having the given IMPI/IMPU pair and the contact address is now ready for serving the IMS subscriber.

At present, with the registration mechanism as described in 3GPP, a user is registered in the network with a given IMPU/IMPI pair and with a given contact address. However, where the user wants to register with another IMPI of the same IMS subscription or with another contact address, the same previous registration mechanism has to be repeated with said another IMPI or another contact address. Regarding the registration of contacts, when the user initiates a new registration attempt, the new contact traverses the network within the SIP header until the 'SIP Register' message arrives to the S-CSCF. The S-CSCF stores the contact bound to the IMPU received in the SIP message or to the IRS received from HSS during the registration process.

To somewhat alleviate this, the IMPU sharing concept, as described in 3GPP, allows an IMPU being shared by all the IMPIs of the same subscription, so that, a contact address associated with the shared IMPU can be shared by all the IMPIs of the IMS subscription.

In this respect, FIGS. 10A-10C illustrate how the S-CSCF builds up a data model based on the information received from successive registrations with the 'SIP Register' message and corresponding information received from the HSS. As illustrated in FIG. 10A, a user first registers with an IMPI-1, an IMPU-3, which is a shared IMPU as illustrated in FIG. 1, and with a contact address for the IMPI-1; and, since an implicit registration set IRS-2 of IMPUs is configured with IMPU-3 and IMPU-4, the S-CSCF builds up a data model associating the IMPI-1 with the IRS-2 and with the first contact address for the IMPI-1. Then, as illustrated in FIG. 10B, the user registers with a new IMPI-2, the same IMPU-3 and a first contact address for the IMPI-2; and the S-CSCF upgrades the data model associating both IMPI-1 and IMPI-2 with the IRS-2 and with the contact address for the IMPI-1 and the first contact address for the IMPI-2. Further, as illustrated in FIG. 10C, the user registers with the same IMPI-2 as in the latest registration, the same IMPU-3 and a second contact address for the IMPI-2; and again the S-CSCF upgrades the data model associating both IMPI-1 and IMPI-2 with the IRS-2 and with the contact address for the IMPI-1, the first contact address for the IMPI-2 and the second contact address for the IMPI-2.

This approach is still very inefficient since, generally speaking, the existing mechanism only allows the registration of one IMPI and one contact address in a single registration process. Moreover, the existing mechanism does not allow yet the registration of a shared IMPU from a given contact address, e.g. a home PC, and automatically enabling to receive terminating calls in another contact address, e.g. a mobile terminal.

SUMMARY

The technology disclosed herein is aimed to obviate at least some of the above disadvantages and provides for a new method and an enhanced HSS to allow the implicit registration of more than one IMPI, or the implicit registration of more than one contact address, or both, upon the explicit registration of a user with a given IMPI/IMPU pair and a. given contact address.

In accordance with a first aspect of the technology disclosed herein, there is provided a new method of registering, during a single registration process in an IP Multimedia Subsystem "IMS", at least one implicit registration set selected from: an implicit registration of a number 'n' of IMS private identities and an implicit registration of a number 'm' of contact addresses.

This method comprises the steps of: configuring subscriber data for the subscriber at the HSS with at least one implicit registration set selected from: a set including a number 'n' of IMPIs associated with the given IMPI or with the given IMPU, and a set including a number 'm' of contact addresses per IMPI basis; receiving at a HSS, which holds subscriptions for subscribers of the IMS, from a S-CSCF, which is currently assigned for serving a subscriber of the IMS, an indication of a registration of said subscriber with a given IMPU and a given IMPI, and an identifier of said S-CSCF; downloading from the HSS towards the S-CSCF said at least one implicit registration set; and building up a data model in the S-CSCF comprising: the given IMPI explicitly registered, the given IMPU explicitly registered, and the at least one implicit registration set selected from: the set including a number 'n' of IMPIs associated with the given IMPI or with the given IMPU, and the set including a number 'm' of contact addresses per IMPI basis.

In particular, where no set is configured with contact addresses per IMPI basis, the selected implicit registration set may be the set of 'n' IMPIs associated with the given IMPI or the given IMPU. Likewise, where no set is configured with IMPIs associated with the given IMPI or the given IMPU, the selected implicit registration set may be the set of 'm' contact addresses per IMPI basis.

In order to offer an additional flexibility to the implicit registration of more than one IMPI, or more than one contact address for a given IMPI, the step of configuring the subscriber data in this method may further comprise a step of setting a configurable parameter per IMPI basis to indicate whether or not such IMPI can be considered at the S-CSCF as implicitly registered only upon confirmation from a UE triggering the registration with the given IMPI and the given IMPU. Alternatively, or complementary, the step of configuring the subscriber data in this method may further comprise a step of setting a configurable parameter per IMPI basis to indicate whether or not such IMPI can be considered at the S-CSCF as implicitly registered depending on a given contact address received at the S-CSCF along with the given IMPI and the given IMPU.

Advantageously in this method, and especially in a so-called Fix-Mobile convergence scenario, the contact addresses are usable to reach at least one IMPI selected amongst the given IMPI explicitly registered and said set of 'n' IMPIs implicitly registered in a number 'm' of fix and mobile devices, namely user's equipments of the fix and mobile networks.

Even though the step of downloading from the HSS towards the S-CSCF the at least one implicit registration set selected from: a set of IMPI's associated with the given IMPI or with the given IMPU, and a set of contact addresses per IMPI basis may be carried out at any time during or after concluding the registration process, advantages may be obtained in terms of data consistency and simplicity where said step of downloading the at least one implicit registration set is carried out along with the downloading during the registration process of those IMPUs in an Implicit Registration Set associated with the given IMPU explicitly registered.

Preferably in this method, the given IMPU is a shared IMPU. Also preferably, the implicit registration of IMPIs and the implicit registration of contact addresses are carried out where the given IMPU is a shared IMPU. The reason is that the IMPIs sharing an IMPU somehow hold a certain relationship and the implicit registration can apparently be acceptable by both IMS subscriber and operator.

On the other hand, where a terminating call addresses a shared IMPU, the HSS cannot determine a single IMPI from an implicit registration of IMPIs to built up an IMPI/IMPU pair related to said terminating call. To overcome this, this method may further comprise a step of configuring at the HSS at least one IMPI in the implicit registration set of 'n' IMPIs with a number of policies to be applied on how to progress the terminating call; and a step of determining at the HSS at least one IMPI for which the policies allow to progress the terminating call to be downloaded towards the S-CSCF as the implicit registration set of IMPIs.

In accordance with a second aspect of the technology disclosed herein, there is provided a new HSS for holding subscriptions for subscribers of the IMS and arranged to configure and download at least one implicit registration set selected from: an implicit registration of a number 'n' of IMS private identities and an implicit registration of a number 'm' of contact addresses.

This HSS comprises an accessible storage for storing IMS subscription data for each IMS subscriber, the IMS subscription data including more than one IMPI and more than one IMPU, wherein each IMPI is associated with at least one IMPU and each IMPU is associated with at least one IMPI, and wherein this accessible storage is arranged for configuring the IMS subscription data for the subscriber with at least one implicit registration set selected from: a set including a number 'n' of IMPIs associated with the given IMPI or with the given IMPU, and a set including a number 'm' of contact addresses per IMPI basis. This HSS also comprises a receiver for receiving from a S-CSCF, which is assigned for serving the subscriber, an indication of a registration of said subscriber with a given IMPU and a given IMPI, and an identifier of said S-CSCF. This HSS also comprises a processing unit for determining whether the given IMPU and the given IMPI are associated, wherein the processing unit is arranged for determining whether an implicit registration set of 'n' IMPIs associated with the given IMPI or with the given IMPU, or an implicit registration set of 'm' contact addresses for the given IMPI, or both implicit registration sets are configured. This HSS also comprises a sender for downloading towards the S-CSCF said at least one implicit registration set.

As for the above method, where no set is configured with contact addresses per IMPI basis, the implicit registration set configured at the accessible storage and determined by the processing unit may be the set of 'n' IMPIs associated with the given IMPI or the given IMPU. Likewise, where no set is configured with IMPIs associated with the given IMPI or the given IMPU, the implicit registration set configured at the accessible storage and determined by the processing unit may be the set of 'm' contact addresses per IMPI basis.

For the sake of an additional flexibility to the implicit registration of more than one IMPI, or more than one contact address for a given IMPI, the accessible storage in this HSS may be arranged for setting a configurable parameter per IMPI basis to indicate whether or not such IMPI can be considered at the S-CSCF as implicitly registered only upon confirmation from a user equipment triggering the registration with the given IMPI and the given IMPU. Alternatively, or complementary, the accessible storage in this HSS may be arranged for setting a configurable parameter per IMPI basis to indicate whether or not such IMPI can be considered at the S-CSCF as implicitly registered depending on a given contact address received at the S-CSCF along with the given IMPI and the given IMPU.

Also advantageously in the so-called Fix-Mobile Convergence scenario, the contact addresses configured at this HSS are usable to reach at least one IMPI selected amongst the given IMPI explicitly registered and said set of 'n' IMPIs implicitly registered in a number 'm' of fix and mobile devices, namely user's equipments of the fix and mobile networks.

As for the above method, and in order to benefit from data consistency and simplicity, the sender may be arranged for downloading during the registration process the at least one selected implicit registration set towards the S-CSCF along with an Implicit Registration Set of IMPUs associated with the given IMPU.

In accordance with a third aspect of the technology disclosed herein, there is provided a new S-CSCF for serving subscribers of the IMS and arranged to receive and built a data model for an IMS subscriber with at least one implicit registration set selected from: an implicit registration of a number 'n' of IMS private identities and an implicit registration of a number 'm' of contact addresses.

This S-CSCF comprises a sender for submitting towards a HSS, which holds subscriptions for subscribers of the IMS, an indication of a registration of an IMS subscriber with a given IMPU and a given IMPI, and an identifier of the S-CSCF; a receiver for receiving from the HSS at least one implicit registration set selected from: a set including a number 'n' of IMPIs associated with the given IMPI or with the given IMPU, and a set including a number 'm' of contact addresses per IMPI basis; and an accessible storage for storing: the given IMPI explicitly registered, the given IMPU explicitly registered, and the at least one implicit registration set selected from: the set of 'n' IMPIs associated with the given IMPI or with the given IMPU, and the set of 'm' contact addresses per IMPI basis.

Also for the sake of an additional flexibility to the implicit registration of more than one IMPI, or more than one contact address for a given IMPI, the receiver of this S-CSCF may be arranged for receiving from the HSS an indication for at least one IMPI in the set of 'n' IMPIs to indicate that the at least one IMPI can be implicitly registered only upon confirmation from a user equipment triggering the registration with the given IMPI and the given IMPU. Alternatively, or complementary, the receiver of this S-CSCF may be arranged for receiving from the HSS an indication for at least one IMPI in the set of 'n' IMPIs to indicate that the at least one IMPI can be implicitly registered depending on a given contact address received by a second receiver at the S-CSCF along with the given IMPI and the given IMPU.

In order to benefit from additional advantages in the so-called Fix-Mobile Convergence scenario, this S-CSCF may further comprise a second sender arranged for using the contact addresses to reach at least one IMPI selected amongst the given IMPI and said set of 'n' IMPIs in a number of fix and mobile devices. To this end, this S-CSCF may further comprise a processing unit arranged for instructing the second sender to submit a message addressing the at least one IMPI selected amongst the given IMPI and said set of 'n' IMPIs towards a number 'm' of fix and mobile devices identified by the 'm' contact addresses received from the HSS.

On the other hand, the technology disclosed herein may be practised by a computer program, in accordance with a fourth aspect of the technology disclosed herein, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the technology disclosed herein will become apparent by reading this description in conjunction with the accompanying drawings, in which:

FIG. 1 basically represents a conventional model of an IMS subscription, in respect of user identities and their relationships, as defined by 3GPP.

FIG. 2 shows a simplified view of an exemplary IMS subscription to better describe embodiments of the technology disclosed herein.

FIG. 3 shows an exemplary configuration at the HSS of implicit registration sets of IMPIs and contact addresses of the exemplary IMS subscription illustrated in FIG. 2, where both implicit registration sets are configured per IMPI basis.

FIG. 4 shows an exemplary configuration at the HSS of implicit registration sets of IMPIs and contact addresses of the exemplary IMS subscription illustrated in FIG. 2, where the implicit registration set of contact addresses is configured per IMPI basis and where the implicit registration set of IMPIs is configured per IMPU basis.

FIG. 5 illustrates a simplified view of the sequence of actions to be performed to carry out a method of registering during a single registration process in an IMS network at least one implicit registration set selected from: an implicit registration set of a number 'n' of IMS private identities and an implicit registration set of a number 'm' of contact addresses, in accordance with an aspect of the technology disclosed herein.

FIG. 6 illustrates an exemplary implementation of a HSS provided for configuring and downloading at least one implicit registration set selected from: an implicit registration set of a number 'n' of IMS private identities and an implicit registration set of a number 'm' of contact addresses, in accordance with an aspect of the technology disclosed herein, wherein the accessible storage is provided by an internal memory integrated into the HSS.

FIG. 7 illustrates an exemplary implementation of a HSS provided for configuring and downloading at least one implicit registration set selected from: an implicit registration set of a number 'n' of IMS private identities and an implicit registration set of a number 'm' of contact addresses, in accordance with an aspect of the technology disclosed herein, wherein the accessible storage is provided by an external database acting as an HSS back-end shared by a plurality of HSS front-ends.

FIG. 8 shows a an exemplary data model of implicit registration sets of IMPIs and contact addresses built up at the S-CSCF with subscriber data downloaded from the HSS in accordance with the exemplary IMS subscription illustrated in FIG. 2.

FIG. 9 illustrates an exemplary implementation of a S-CSCF provided for downloading at least one implicit registration set selected from: an implicit registration set of a number 'n' of IMS private identities and an implicit registration set of a number of contact addresses for an IMS subscriber, and for building up a data model thereof, in accordance with an aspect of the technology disclosed herein.

FIG. 10A-10C illustrate how the S-CSCF conventionally builds up an exemplary data model based on information received from successive explicit registrations and corresponding information received from the HSS.

FIG. 11 shows a simplified view of another exemplary IMS subscription to better describe embodiments of the technology disclosed herein.

FIG. 12 shows another exemplary configuration at the HSS of implicit registration sets of IMPIs and contact addresses of the exemplary IMS subscription illustrated in FIG. 11, where both implicit registration sets are configured per IMPI basis.

FIG. 13 shows another exemplary configuration at the HSS of implicit registration sets of IMPIs and contact addresses of the exemplary IMS subscription illustrated in FIG. 11, where the implicit registration set of contact addresses is configured per IMPI basis and where the implicit registration set of IMPIs is configured per IMPU basis.

FIG. 14 shows still another exemplary and complementary configuration at the HSS of an implicit registration set of IMPIs where no contact addresses is configured for the exemplary IMS subscription illustrated in FIG. 11.

DETAILED DESCRIPTION

The following describes currently preferred embodiments of means and method for handling a terminating call addressing a shared IMPU of an IMS subscription.

FIG. 2 illustrates an exemplary IMS subscription 100 for a subscriber of an IMS network, the IMS subscription including a number of IMPIs 101-105 and another number of IMPUs 106-111. In this exemplary IMS subscription the first IMPU 106 is associated with the first IMPI 101 and with the second IMPI 102, the second IMPU 107 is only associated with the second IMPI 102, the third IMPU 108 and fourth IMPU 109 are shared IMPUs associated with all the IMPIs 101-105 of this IMS subscription 100, the fifth IMPU 110 is associated with the third IMPI 103 and with the fourth IMPI 104 and the sixth IMPU 111 is only associated with the fifth IMPI 105.

In accordance with the technology disclosed herein, there is provided in the HSS 1, 1a at least one implicit registration set selected from: an implicit registration set of 'n' IMPIs associated with a given IMPI or with a given IMPU explicitly registered and an implicit registration set of 'm' contact addresses per IMPI basis, said at least one implicit registration set to be downloaded towards a S-CSCF 2 assigned for serving the IMS subscriber.

FIG. 3 illustrates a first exemplary configuration 120 at the HSS of implicit registration sets of IMPIs and contact addresses of the exemplary IMS subscription illustrated in FIG. 2, where both implicit registration sets are configured per IMPI basis. In this exemplary configuration, and for the sake of simplicity, the first IMPU 106 is supposed to be reachable in a first contact address IP.ad-1, the second IMPU 107 is supposed to be reachable in a second contact address IP.ad-2, the third IMPU 108 is supposed to be reachable in a third contact address IP.ad-3, the fourth IMPU 109 is supposed to be reachable in a fourth contact address IP.ad-4, the fifth IMPU 110 is supposed to be reachable in a fifth contact address IP.ad-5 as well as in another contact address IP.ad-7, and the sixth IMPU 111 is supposed to be reachable in a sixth contact address IP.ad-6.

Particularly in this exemplary configuration 120, there is a unique implicit registration set of IMPIs consisting of the first IMPI 101, the third IMPI 103 and the fifth IMPI 105, and every IMPI in this implicit registration set of IMPIs is configured with said implicit registration set of IMPIs. In this respect, whether a given IMPI 101 in this implicit registration set of IMPIs per given IMPI basis is also stored as included in the set 101 103 105, or the given IMPI 101 is just considered part of the implicit registration set of IMPIs 103 105, is an implementation decision not relevant for the present discussion.

Thus, the first IMPI 101 is configured in the configuration element 121 as associated with first IMPU 106, third IMPU 108 and fourth IMPU 109; with an implicit registration set of IMPIs including itself plus the third IMPI 103 and the fifth IMPI 105; and with an implicit registration set of contact addresses including IP.ad-1, IP.ad-3 and IP.ad-4. In this respect, depending on the implementation decision explained above, the implicit registration set of IMPIs may include the whole set consisting of the first IMPI 101, the third IMPI 103 and the fifth IMPI 105, without departing from the scope of the technology disclosed herein.

Likewise, the second IMPI 102 is configured in the configuration element 122 as associated with first IMPU 106, second IMPU 107, third IMPU 108 and fourth IMPU 109; with no implicit registration set of IMPIs; and with an implicit registration set of contact addresses including IP.ad-2, IP.ad-3 and IP.ad-4. The third IMPI 103 is configured in the configuration element 123 as associated with third IMPU 108, fourth IMPU 109 and fifth IMPU 110; with an implicit registration set of IMPIs including itself plus the first IMPI 101 and the fifth IMPI 105; and with an implicit registration set of contact addresses including IP.ad-3, IP.ad-4 and IP.ad-7. The fourth IMPI 104 is configured in the configuration element 124 as associated with third IMPU 108, fourth IMPU 109 and fifth IMPU 110; with no implicit registration set of IMPIs; and with an implicit registration set of contact addresses including IP.ad-3, IP.ad-4 and IP.ad-5. The fifth IMPI 105 is configured in the configuration element 125 as associated with third IMPU 108, fourth IMPU 109 and sixth IMPU 111; with an implicit registration set of IMPIs including itself plus the first IMPI 101 and the third IMPI 103; and with an implicit registration set of contact addresses including IP.ad-3, IP.ad-4 and IP.ad-6.

FIG. 3 also illustrates a conventional configuration 112 at the HSS, which is complementary to the above first exemplary configuration 120, of implicit registration sets of IMPIs of the exemplary IMS subscription illustrated in FIG. 2. In this conventional configuration 112, the first IMPU 106 is configured in the configuration element 114 with no implicit registration set of IMPUs; the second IMPU 107 is configured in the configuration element 115 with an implicit registration set of IMPUs including itself 107 plus the first IMPU 106; the third IMPU 108 is configured in the configuration element 116 with an implicit registration set of IMPUs including itself 108 plus the fourth IMPU 109; the fourth IMPU 109 is configured in the configuration element 117 with an implicit registration set of IMPUs including itself 109 plus the third IMPU 108; the fifth IMPU 110 is configured in the configuration element 118 with no implicit registration set of IMPUs; and the sixth IMPU 111 is configured in the configuration element 119 with no implicit registration set of IMPUs.

FIG. 4 illustrates a second exemplary configuration 130, 140 at the HSS of implicit registration sets of IMPIs and contact addresses of the exemplary IMS subscription illustrated in FIG. 2, where the implicit registration set of contact addresses is configured per IMPI basis 130 and where the implicit registration set of IMPI's is configured per IMPU basis 140.

Thus, the first IMPI 101 is configured in the configuration element 131 as associated with first IMPU 106, third IMPU 108 and fourth IMPU 109; and with an implicit registration set of contact addresses including IP.ad-1, IP.ad-3 and IP.ad-4. The second IMPI 102 is configured in the configuration element 132 as associated with first IMPU 106, second IMPU 107, third IMPU 108 and fourth IMPU 109; and with an implicit registration set of contact addresses including IP.ad-2, IP.ad-3 and IP.ad-4. The third IMPI 103 is configured in the configuration element 133 as associated with third IMPU 108, fourth IMPU 109 and fifth IMPU 110; and with an implicit registration set of contact addresses including IP.ad-3, IP.ad-4 and IP.ad-7. The fourth IMPI 104 is configured in the configuration element 134 as associated with third IMPU 108, fourth IMPU 109 and fifth IMPU 110; and with an implicit registration set of contact addresses including IP.ad-3, IP.ad-4 and IP.ad-5. The fifth IMPI 105 is configured in the configuration element 135 as associated with third IMPU 108, fourth IMPU 109 and sixth IMPU 111; and with an implicit registration set of contact addresses including IP.ad-3, IP.ad-4 and IP.ad-6.

As mentioned above, in the approach illustrated in FIG. 4, the implicit registration set of IMPIs is configured per IMPU basis. Thus, FIG. 4 illustrates a configuration 140 at the HSS, which is complementary to the above second exemplary configuration 130, with the implicit registration set of IMPIs configured per IMPU basis.

In this configuration 140, the first IMPU 106 is configured in the configuration element 141 with no implicit registration set of IMPUs; and with an implicit registration set of IMPIs including the first IMPI 101, the third IMPI 103 and the fifth IMPI 105. The second IMPU 107 is configured in the configuration element 142 with an implicit registration set of IMPUs including itself 107 plus the first IMPU 106; and with an implicit registration set of IMPIs including the first IMPI 101 and the second IMPI 102. The third IMPU 108 is configured in the configuration element 143 with an implicit registration set of IMPUs including itself 108 plus the fourth IMPU 109; and with an implicit registration set of IMPIs including the first IMPI 101, the third IMPI 103 and the fifth IMPI 105. The fourth IMPU 109 is configured in the configuration element 144 with an implicit registration set of IMPUs including itself 109 plus the third IMPU 108; and with an implicit registration set of IMPIs including the first IMPI 101, the third IMPI 103 and the fifth IMPI 105. The fifth IMPU 110 is configured in the configuration element 145 with no implicit registration set of IMPUs; and with an implicit registration set of IMPIs including the third IMPI 103 and the fourth IMPI 104. The sixth IMPU 111 is configured in the configuration element 146 with no implicit registration set of IMPUs; and with an implicit registration set of IMPIs including the first IMPI 101, the third IMPI 103 and the fifth IMPI 105.

Other combinations are also possible in the light of the above first and second exemplary embodiments and complementary configuration data. For example, where no implicit registration set of IMPIs is provided, the set of configuration elements 130, including implicit registration sets of contact addresses, may be complemented with the set of configuration elements 112, including implicit registration sets of IMPUs.

On the other hand, a current restriction under 3GPP precludes a certain IMPU being shared by more than one IMPI whilst not shared by all the IMPIs in the IMS subscription. That is, in accordance with 3GPP, if a certain IMPU is shared it must be shared by all the IMPIs in the IMS subscription. The above exemplary configurations 120 and 112 or 130 and 140, implementing the exemplary IMS subscription 100 illustrated in FIG. 2, is not restricted as 3GPP currently recommends. In fact, as shown in FIG. 2, the first IMPU 106 is only shared by the first IMPI 101 and the second IMPI 102, and the fifth IMPU 110 is only shared by the third IMPI 103 and the fourth IMPI 104; whereas the third IMPU 108 and the fourth IMPU 109 are the only shared IMPUs in accordance with 3GPP, shared by all the IMPIs 101-105 of the IMS subscription.

However, the technology disclosed herein also fits well the restriction in 3GPP whereby a certain IMPU, being shared by more than one IMPI, is shared by all the IMPIs in the IMS subscription.

FIG. 11 illustrates another exemplary IMS subscription 155 for a subscriber of an IMS network, the IMS subscription including a number of IMPIs 156-160 and another number of IMPUs 161-166. In this exemplary IMS subscription the first IMPU 161 is associated with the first IMPI 156, the second IMPU 162 is associated with the second IMPI 157, the third IMPU 163 and fourth IMPU 164 are shared IMPUs associated with all the IMPIs 156-160 of this IMS subscription 155, the fifth IMPU 165 is associated with the fourth IMPI 159 and the sixth IMPU 166 is associated with the fifth IMPI 160.

In this respect, FIG. 12 illustrates a third exemplary configuration 170 at the HSS of implicit registration sets of IMPIs and contact addresses of the exemplary IMS subscription illustrated in FIG. 11, where both implicit registration sets are configured per IMPI basis. In this exemplary configuration, and for the sake of simplicity, the first IMPU 161 is supposed to be reachable in a first contact address IP.ad-1, the second IMPU 162 is supposed to be reachable in a second contact address IP.ad-2, the third IMPU 163 is supposed to be reachable in a third contact address IP.ad-3, the fourth IMPU 164 is supposed to be reachable in a fourth contact address IP.ad-4, the fifth IMPU 165 is supposed to be reachable in a fifth contact address IP.ad-5, and the sixth IMPU 166 is supposed to be reachable in a sixth contact address IP.ad-6.

Also in this third exemplary configuration 170, as for the first exemplary configuration 120 explained above, there is a unique implicit registration set of IMPIs consisting of the first IMPI 156, the third IMPI 158 and the fifth IMPI 160, and every IMPI in this implicit registration set of IMPIs is configured with said implicit registration set of IMPIs. In this respect, whether a given IMPI 156 in this implicit registration set of IMPIs is per given IMPI basis is also stored as included in the set 156 158 160, or the given IMPI 156 is just considered part of the implicit registration set of IMPIs 158 160, is an implementation decision not relevant for the present discussion.

As illustrated in FIG. 12, the first IMPI 156 is configured in the configuration element 171 as associated with first IMPU 161, third IMPU 163 and fourth IMPU 164; with an implicit registration set of IMPIs including itself plus the third IMPI 158 and the fifth IMPI 160; and with an implicit registration set of contact addresses including IP.ad-1, IP.ad-3 and IP.ad-4. In this respect, depending on the implementation decision explained above, the implicit registration set of IMPIs may include the whole set consisting of the first IMPI 156, the third IMPI 158 and the fifth IMPI 160, without departing from the scope of the technology disclosed herein.

Likewise, the second IMPI 157 is configured in the configuration element 172 as associated with second IMPU 162, third IMPU 163 and fourth IMPU 164; with no implicit registration set of IMPIs; and with an implicit registration set of contact addresses including IP.ad-2, IP.ad-3 and IP.ad-4. The third IMPI 158 is configured in the configuration element 173 as associated with third IMPU 163 and fourth IMPU 164; with an implicit registration set of IMPIs including itself plus the first IMPI 156 and the fifth IMPI 160; and with an implicit registration set of contact addresses including IP.ad-3 and IP.ad-4. The fourth IMPI 159 is configured in the configuration element 174 as associated with third IMPU 163, fourth IMPU 164 and fifth IMPU 165; with no implicit registration set of IMPIs; and with an implicit registration set of contact addresses including IP.ad-3, IP.ad-4 and IP.ad-5. The fifth IMPI 160 is configured in the configuration element 175 as associated with third IMPU 163, fourth IMPU 164 and sixth IMPU 166; with an implicit registration set of IMPIs including itself plus the first IMPI 156 and the third IMPI 158; and with an implicit registration set of contact addresses including IP.ad-3, IP.ad-4 and IP.ad-6.

FIG. 12 also illustrates a conventional configuration 180 at the HSS, which is complementary to the above third exemplary configuration 170, of implicit registration sets of IMPUs of the exemplary IMS subscription 155 illustrated in FIG. 11. In this conventional configuration 180, the first IMPU 161 is configured in the configuration element 181 with no implicit registration set of IMPUs; the second IMPU 162 is configured in the configuration element 182 with no implicit registration set of IMPUs; the third IMPU 163 is configured in the configuration element 183 with an implicit registration set of IMPUs including itself 163 plus the fourth IMPU 164; the fourth IMPU 164 is configured in the configuration element 184 with an implicit registration set of IMPUs including itself 164 plus the third IMPU 163; the fifth IMPU 165 is configured in the configuration element 185 with no implicit registration set of IMPUs; and the sixth IMPU 166 is configured in the configuration element 186 with no implicit registration set of IMPUs.

FIG. 13 illustrates a fourth exemplary configuration 190, 200 at the HSS of implicit registration sets of IMPIs and contact addresses of the exemplary IMS subscription 155 illustrated in FIG. 11, where the implicit registration set of contact addresses is configured per IMPI basis 190 and where the implicit registration set of IMPIs is configured per IMPU basis 200.

Thus, the first IMPI 156 is configured in the configuration element 191 as associated with first IMPU 161, third IMPU 163 and fourth IMPU 164; and with an implicit registration set of contact addresses including IP.ad-1, IP.ad-3 and IP.ad-4. The second IMPI 157 is configured in the configuration element 192 as associated with second IMPU 162, third IMPU 163 and fourth IMPU 164; and with an implicit registration set of contact addresses including IP.ad-2, IP.ad-3 and IP.ad-4. The third IMPI 158 is configured in the configuration element 193 as associated with third IMPU 163 and fourth IMPU 164; and with an implicit registration set of contact addresses including IP.ad-3 and IP.ad-4. The fourth IMPI 159 is configured in the configuration element 194 as associated with third IMPU 163, fourth IMPU 164 and fifth IMPU 165; and with an implicit registration set of contact addresses including IP.ad-3, IP.ad-4 and IP.ad-5. The fifth IMPI 160 is configured in the configuration element 195 as associated with third IMPU 163, fourth IMPU 164 and sixth IMPU 166; and with an implicit registration set of contact addresses including IP.ad-3, IP.ad-4 and IP.ad-6.

Also in the approach illustrated in FIG. 13, the implicit registration set of IMPIs is configured per IMPU basis. Thus, FIG. 13 illustrates a configuration 200 at the HSS, which is complementary to the above exemplary configuration 190, with the implicit registration set of IMPIs configured per IMPU basis.

In this configuration 200, the first IMPU 161 is configured in the configuration element 201 with no implicit registration set of IMPIs; and with an implicit registration set of IMPIs including the first IMPI 156, the third IMPI 158 and the fifth IMPI 160. The second IMPU 162 is configured in the configuration element 202 with no implicit registration set of IMPUs and with no implicit registration set of IMPIs. The third IMPU 163 is configured in the configuration element 203 with an implicit registration set of IMPUs including itself 163 plus the fourth IMPU 164; and with an implicit registration set of IMPIs including the first IMPI 156, the third IMPI 158 and the fifth IMPI 160. The fourth IMPU 164 is configured in the configuration element 204 with an implicit registration set of IMPUs including itself 164 plus the third IMPU 163; and with an implicit registration set of IMPIs including the first IMPI 156, the third IMPI 158 and the fifth IMPI 160. The fifth IMPU 165 is configured in the configuration element 205 with no implicit registration set of IMPUs; and with no implicit registration set of IMPIs. The sixth IMPU 166 is configured in the configuration element 206 with no implicit registration set of IMPUs; and with an implicit registration set of IMPIs including the first IMPI 156, the third IMPI 158 and the fifth IMPI 160.

Other combinations are also possible in the light of the above exemplary embodiments and complementary configuration data. For example, where no implicit registration set of contact addresses is configured for the exemplary IMS subscription illustrated in FIG. 11, FIG. 14 illustrates alternative sets of configuration elements 170*bis* and 190*bis* to the above third and fourth configuration elements 170 and 190.

As illustrated in the configuration set 170*bis* of FIG. 14, the first IMPI 156 is configured in the configuration element 171*bis* as associated with first IMPU 161, third IMPU 163 and fourth IMPU 164; and with an implicit registration set of IMPIs including itself plus the third IMPI 158 and the fifth IMPI 160. In this respect, depending on the implementation decision explained above, the implicit registration set of IMPIs may include the whole set consisting of the first IMPI 156, the third IMPI 158 and the fifth IMPI 160, without departing from the scope of the technology disclosed herein.

Likewise, the second IMPI 157 is configured in the configuration element 172bis as associated with second IMPU 162, third IMPU 163 and fourth IMPU 164; and with no implicit registration set of IMPIs. The third IMPI 158 is configured in the configuration element 173bis as associated with third IMPU 163 and fourth IMPU 164; and with an implicit registration set of IMPIs including itself plus the first IMPI 156 and the fifth IMPI 160. The fourth IMPI 159 is configured in the configuration element 174bis as associated with third IMPU 163, fourth IMPU 164 and fifth IMPU 165; and with no implicit registration set of IMPIs. The fifth IMPI 160 is configured in the configuration element 175bis as associated with third IMPU 163, fourth IMPU 164 and sixth IMPU 166; and with an implicit registration set of IMPIs including itself plus the first IMPI 156 and the third IMPI 158.

On the other hand, where the implicit registration sets of IMPIs are configured per IMPU basis and no set of contact addresses is configured, the configuration set 200 of FIG. 13 may be provided in combination with the configuration set 190bis of FIG. 14.

Thus, the first IMP 156 is configured in the configuration element 191bis as associated with first IMPU 161, third IMPU 163 and fourth IMPU 164. The second IMPI 157 is configured in the configuration element 192bis as associated with second IMPU 162, third IMPU 163 and fourth IMPU 164. The third IMPI 158 is configured in the configuration element 193bis as associated with third IMPU 163 and fourth IMPU 164. The fourth IMPI 159 is configured in the configuration element 194bis as associated with third IMPU 163, fourth IMPU 164 and fifth IMPU 165. The fifth IMPI 160 is configured in the configuration element 195bis as associated with third IMPU 163, fourth IMPU 164 and sixth IMPU 166.

In operation, once a subscriber has registered in an access network and has got IP connectivity, such subscriber may register into the IMS network. To this end, the method illustrated in FIG. 5 may be followed to register a subscriber with a UE 5 in the IMS network.

As illustrated in FIG. 5, this method starts with a step S-100 of configuring subscriber data for the subscriber at the HSS. This subscriber data includes at least one implicit registration set selected from: a set 120, 140, 170 or 200 including a number 'n' of IMPIs per IMPI or per IMPU basis, and a set 120, 130, 170 or 190 including a number of contact addresses per IMPI basis.

The method illustrated in FIG. 5 continues with the explicit registration of the subscriber with UE 5 into the IMS. To this end, the UE 5 submits a register message during a step S-105 towards a P-CSCF 4 for accessing the IMS network. This register message includes a given IMPI and a given IMPU be registered during this registration process, namely the IMPI 103 and the IMPU 108 in the exemplary IMS subscription 100 illustrated in FIG. 2, and a contact address associated with the currently used UE 5.

The P-CSCF 4 forwards such message during a step S-110 towards an I-CSCF 3 of the IMS network where the destination subscriber belongs. The I-CSCF is in charge of selecting an appropriate S-CSCF for serving the IMS subscriber, and queries during a step S-115 a HSS 1 or 1a, which is in charge of subscription data for subscribers of the IMS network where the IMS subscriber belongs to, with the given IMPI/IMPU pair and a network identifier of the P-CSCF 4.

Assuming that the IMS subscriber had not previously registered the IMPI/IMPU pair 103 108, the HSS 1 or 1a returns during a step S-120 the capabilities required for an S-CSCF to be assigned for serving the IMS subscriber. The I-CSCF 3 receiving such capabilities selects an appropriate S-CSCF 2 fulfilling the capabilities, and forwards the register message during a step S-125 with the IMPI/IMPU pair and the contact address towards said S-CSCF 2. The S-CSCF 2 receiving the register message submits during a step S-130 its own registration towards the HSS 1 or 1a to indicate it has been assigned for serving the subscriber identified by the given IMPI 103 and given IMPU 108.

The HSS 1 or 1a, as receiving an indication of a registration of the subscriber with a given IMPU 108 and a given IMPI 103, and an identifier of said S-CSCF 2, determines at least one implicit registration set selected from: a set 120, 140, 170 or 200 of IMPIs 101, 105 associated with the given IMPI 103 or with the given IMPU 108, and a set 120, 130, 170 or 190 of contact addresses for the given IMPI 103, and downloads said at least one implicit registration set towards the S-CSCF 2 during a step S-135.

The S-CSCF 2, as receiving said at least one implicit registration set, builds up during a step S-140 a data model 150, exemplary illustrated in FIG. 8, and comprising: the given IMPI 103 explicitly registered, the given IMPU 108 explicitly registered, and the at least one implicit registration set selected from: the set 151 of IMPIs associated with the given IMPI or with the given IMPU, and the set 153 of contact addresses for the given IMPI.

In addition or complementary to these actions, the HSS may carry out at this stage the conventional steps of marking said IMPI 103 and IMPU 108 as 'registered', storing a reference to the S-CSCF as been assigned for serving the IMS subscriber, and downloading a user profile associated with the given IMPU 108 towards the S-CSCF. Moreover, this user profile may include a conventional Implicit Registration Set 152 of IMPUs which may be included in the data model 150, exemplary illustrated in FIG. 8.

The S-CSCF receiving the user profile for the IMS subscriber and already having the given IMPI/IMPU pair and the contact address is now ready for serving the IMS subscriber. As illustrated in FIG. 5, this is confirmed from the S-CSCF 2 back to the I-CSCF 2 during a step S-145, and this confirmation is forwarded from the I-CSCF towards the P-CSCF 4 during a step S-150 and from the latter towards the UE 5 during a step S-155.

In order to carry out the method illustrated in FIG. 5, there is provided an enhanced HSS 1 or 1a, as illustrated in FIG. 6 and FIG. 7, and an enhanced S-CSCF 2, as illustrated in FIG. 9.

Thus, the HSS 1 or 1a illustrated in FIG. 6 and FIG. 7 comprises an accessible storage for storing IMS subscription data for each IMS subscriber, wherein the IMS subscription data includes more than one IMPI 120, 130, 170 or 190 and more than one IMPU 112, 140, 180 or 200, wherein each IMPI is associated with at least one IMPU and wherein each IMPU is associated with at least one IMPI. This accessible storage is arranged for configuring the IMS subscription data for the subscriber with at least one implicit registration set selected from: a set 120, 140, 170 or 200 with a number 'n' of IMPIs associated with the given IMPI or with the given IMPU, and a set 120, 130, 170 or 190 with a number of contact addresses per IMPI basis.

In particular, as illustrated in FIG. 7, the accessible storage in the HSS may include an external database 10a acting as an HSS back-end shared by a plurality of HSS front-ends 1a-1d, and a memory handler 11 for interfacing with the external database. Alternatively, as illustrated in FIG. 6, the accessible storage in the HSS may be provided as an internal memory 10.

This HSS also comprises a receiver 50 for receiving from the S-CSCF 2 an indication of the registration of said subscriber with the given IMPU 108 and the given IMPI 103, and an identifier of said S-CSCF; a processing unit 20 for determining whether the given IMPU and the given IMPI are associated, and wherein this processing unit is arranged for determining whether an implicit registration set 151 of 'n' IMPIs associated with the given IMPI or with the given IMPU, or an implicit registration set 153 of 'm' contact addresses for the given IMPI, or both implicit registration sets are configured; and a sender 40 for downloading towards the S-CSCF 2 said at least one implicit registration set.

Correspondingly, the S-CSCF 2 illustrated in FIG. 9 comprises a sender 46 for submitting towards the HSS 1 or 1a an indication of a registration of an IMS subscriber with the given IMPU 108 and the given IMPI 103, and an identifier of the S-CSCF; a receiver 56 for receiving from the HSS 1 or 1a the at least one implicit registration set selected from: the set 151 with a number 'n' of IMPIs associated with the given IMPI or with the given IMPU, and the set 153 with a number of contact addresses per IMPI basis; and an accessible storage 15 for storing: the given IMPI 103 explicitly registered, the given IMPU 108 explicitly registered, and the at least one implicit registration set selected from: the set 151 of 'n' IMPIs associated with the given IMPI or with the given IMPU, and the set 153 of 'm' contact addresses per IMPI basis.

Still with reference to the method illustrated in FIG. 5, the at least one implicit registration set configured at the HSS and downloaded towards the S-CSCF may be the set 151 of 'n' IMPIs associated with the given IMPI or the given IMPU, where there is no set configured with contact addresses per IMPI basis, or may be the set 153 of 'm' contact addresses per IMPI basis, where there is no set configured with IMPIs associated with the given IMPI or with the given IMPU, or may include both sets 151 and 153.

To this end, the implicit registration set configured at the accessible storage, determined by the processing unit 20 and downloaded from the sender 40 of the HSS shown in FIG. 6 and FIG. 7 towards the S-CSCF may be the implicit registration set 120 or 140 of 'n' IMPIs associated with the given IMPI or with the given IMPU, or may be the implicit registration set 120 or 130 of 'm' contact addresses for the given IMPI, or both. Likewise, the receiver 56, a processing unit 25 and the accessible storage 15 of the S-CSCF cooperate to receive and build up the data model 150 with only the implicit registration set 151 of 'n' IMPIs, only the implicit registration set 153 of 'm' contact addresses, or both.

Regarding the implicit registration of IMPIs at the S-CSCF, additional and advantageous embodiments are provided in accordance with the technology disclosed herein, and in order to give the subscriber control over the implicit registration of IMPIs. In an embodiment of the technology disclosed herein, the step S-100 of configuring the subscriber data may further comprise a step, not illustrated in any drawing, of setting a configurable parameter per IMPI basis to indicate whether or not such IMPI can be considered at the S-CSCF 2 as implicitly registered only upon confirmation from the UE 5 triggering the registration with the given IMPI 103 and the given IMPU 108.

To this end, the accessible storage of the HSS illustrated in FIG. 6 and FIG. 7 may be arranged for setting a configurable parameter per IMPI basis to indicate whether or not such IMPI can be considered at the S-CSCF 2 as implicitly registered only upon confirmation from the UE 5 triggering the registration with the given IMPI 103 and the given IMPU 108. Correspondingly, the receiver 56 of the S-CSCF 2 illustrated in FIG. 9 may be arranged for receiving from the HSS such indication, whereas the processing unit 25 and the accessible storage 15 therein cooperate to take into consideration such indication as building up the data model 150.

In another embodiment of the technology disclosed herein, the step S-100 of configuring the subscriber data may further comprise a step, not illustrated in any drawing, of setting a configurable parameter per IMPI basis to indicate whether or not such IMPI can be considered at the S-CSCF 2 as implicitly registered depending on the given contact address received at the S-CSCF 2 during the step S-125 along with the given IMPI 103 and the given IMPU 108.

To this end, the accessible storage of the HSS illustrated in FIG. 6 and FIG. 7 may be arranged for setting a configurable parameter per IMPI basis to indicate whether or not such IMPI can be considered at the S-CSCF 2 as implicitly registered depending on a given contact address received at the S-CSCF along with the given IMPI 103 and the given IMPU 108. Correspondingly, the receiver 56 of the S-CSCF 2 illustrated in FIG. 9 may be arranged for receiving from the HSS such indication, whereas the processing unit 25 and the accessible storage 15 therein cooperate to take into consideration such indication as building up the data model 150. In particular, the S-CSCF 2 illustrated in FIG. 9 also includes a second receiver 57 for receiving during the step S-125 the registration message originated from the UE 5 with the given IMPI 103, the given IMPU 108 and the given contact address; this contact address to be taken into consideration along with the indication received from the HSS in order to consider the implicit registration of IMPIs.

Generally speaking, the contact addresses are usable to reach at least one IMPI selected amongst the given IMPI and said set 151 of 'n' IMPIs in a number 'm' of fix and mobile devices. To this end, S-CSCF illustrated in FIG. 9, may further comprise a second sender 47 arranged for using the contact addresses to reach at least one IMPI selected amongst the given IMPI and said set of 'n' IMPIs in a number 'm' of fix and mobile devices 5-5m. More precisely, the processing unit 25 of the S-CSCF may be arranged for instructing the second sender 47 to submit a message addressing the at least one IMPI selected amongst the given IMPI and said set of 'n' IMPIs towards a number 'm' of fix and mobile devices 5-5m identified by the 'm' contact addresses received from the HSS 1 or 1a.

In particular, the S-CSCF 2 may be implemented so that the first and second receivers 56 and 57, or the first and second senders 46 and 47, are a same receiver 55 or sender 45 respectively, or even a unique input/output unit 35.

In accordance with current 3GPP specifications, if an IMPU is shared by more than one IMPI of an IMS subscription then such IMPU must be shared by all the IMPIs of the IMS subscription. Even though the technology disclosed herein is not that restrictive, it still fits with the current 3GPP specifications as above commented in respect of the exemplary subscription 155 illustrated in FIG. 11 and exemplary configurations illustrated in FIG. 12 to FIG. 14. In this respect, the given IMPU explicitly registered in the method illustrated in FIG. 5 may be a shared IMPU 163 in accordance with current 3GPP restrictions, or a shared IMPU 108 in accordance with the exemplary subscription 100 illustrated in FIG. 2 wherein a certain IMPU can be shared by more than one IMPI and not necessarily by all the IMPIs of the IMS subscription.

Again with reference to the method illustrated in FIG. 5, the downloading during the step S-135 of the at least one implicit registration set of IMPIs, or contact addresses, or both, from the HSS 1 or 1a towards the S-CSCF 2 may be carried out along with the downloading during the registration process of those IMPUs in an Implicit Registration Set 152 of IMPUs, if any, associated with the given IMPU 108.

To this end, the sender 40 of the HSS is arranged for downloading during the registration process said at least one selected implicit registration set of IMPIs, or contact addresses, or both, towards the S-CSCF along with an Implicit Registration Set 152 of IMPUs, if any, associated with the given IMPU.

Advantageously, and in order to allow a higher granularity per IMS subscription than the approach offered by 3GPP, as currently demanded by operators, and especially applicable where a given IMPU in a terminating call is a shared IMPU associated with a plurality of IMPIs in the IMS subscription, the technology disclosed herein proposes the provision of a number of policies to be applied per IMPI basis.

Thus, the method illustrated in FIG. 5 may further comprise a steps of configuring at the HSS at least one IMPI in the implicit registration set of IMPIs with a number of policies to be applied on how to progress the terminating call; and a step of determining at the HSS at least one IMPI for which the policies allow to progress the terminating call to be downloaded towards the S-CSCF 2 as the implicit registration set of IMPIs.

To this end, the accessible storage of the HSS is arranged for configuring at least one IMPI in the implicit registration set of 'n' IMPIs with a number of policies to be applied on how to progress the terminating call; and the processing means 20 of the HSS is arranged for determining at least one IMPI for which the policies allow to progress the terminating call to be downloaded towards the S-CSCF 2 as the implicit registration set of IMPIs.

The technology disclosed herein may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The technology disclosed herein is described above in connection with various embodiments that are intended to be illustrative and non-restrictive. It is expected that those of ordinary skill in this art may modify these embodiments. The scope of the technology disclosed herein is defined by the claims in conjunction with the description and drawings, and all modifications that fall within the scope of the claims are intended to be included therein.

The invention claimed is:

1. A method of registering during a single registration process in an IP Multimedia Subsystem "IMS" at least one implicit registration set selected from: an implicit registration of a number 'n' of IMS private identities and an implicit registration of a number 'm' of contact addresses, the method comprising:
   receiving at a Home Subscriber Server "MSS", which holds subscriptions for subscribers of the IMS, from a Serving Call Session Control Function "S-CSCF", which is currently assigned for serving a subscriber of the IMS, an indication of a registration of said subscriber with a given IMS public identity "IMPU" and a given IMS private identity "IMPI", and an identifier of said S-CSCF;
   configuring subscriber data for the subscriber at the HSS with at least one implicit registration set selected from: a set including a number 'n' of IMPIs associated with the given IMPI or with the given IMPU, and a set including a number 'm' of contact addresses per IMPI basis;
   downloading from the HSS towards the S-CSCF said at least one implicit registration set; and
   building up a data model in the S-CSCF comprising: the given IMPI explicitly registered, the given IMPU explicitly registered, and the at least one implicit registration set selected from: the set including a number 'n' of IMPIs associated with the given IMPI or with the given IMPU, and the set including a number 'm' of contact addresses per IMPI basis.

2. The method of claim 1, wherein the selected implicit registration set is the set of 'n' IMPIs associated with the given IMPI or the given IMPU and there is no set configured with contact addresses per IMPI basis.

3. The method of claim 1, wherein the selected implicit registration set is the set of 'm' contact addresses per IMPI basis and there is no set configured with IMPIs associated with the given IMPI or with the given IMPU.

4. The method of claim 1, wherein configuring the subscriber data further comprises setting a configurable parameter per IMPI basis to indicate whether or not such IMPI can be considered at the S-CSCF as implicitly registered only upon confirmation from a user equipment "UE" triggering the registration with the given IMPI and the given IMPU.

5. The method of claim 1, wherein configuring the subscriber data further comprises setting a configurable parameter per IMPI basis to indicate whether or not such IMPI can be considered at the S-CSCF as implicitly registered depending on a given contact address received at the S-CSCF along with the given IMPI and the given IMPU.

6. The method of claim 1, wherein the contact addresses are usable to reach at least one IMPI selected amongst the given IMPI and said set of 'n' IMPIs in a number 'm' of fix and mobile devices.

7. The method of claim 1, wherein the downloading from the HSS towards the S-CSCF of said at least one implicit registration set is carried out along with the downloading during the registration process of those IMPUs in an Implicit Registration Set associated with the given IMPU.

8. The method of claim 1, wherein the given IMPU is a shared IMPU.

9. The method of claim 1, further comprising:
   configuring at the HSS at least one IMPI in the implicit registration set of 'n' IMPIs with a number of policies to be applied on how to progress the terminating call; and
   determining at the HSS at least one IMPI for which the policies allow to progress the terminating call to be downloaded towards the S-CSCF as the implicit registration set of IMPIs.

10. A Home Subscriber Server "HSS" for holding subscriptions for subscribers of an IP Multimedia Subsystem "IMS", the HSS comprising:
    an accessible storage for storing IMS subscription data for each IMS subscriber, the IMS subscription data including more than one IMS private identity "IMPI" and more than one IMS public identity "IMPU", wherein each IMPI is associated with at least one IMPU and wherein each IMPU is associated with at least one IMPI;
    a receiver for receiving from a Serving Call Session Control Function "S-CSCF", which is assigned for serving the subscriber, an indication of a registration of said subscriber with a given IMS public identity "IMPU" and a given IMS private identity "IMPI", and an identifier of said S-CSCF; and
    a processing unit for determining whether the given IMPU and the given IMPI are associated;
    wherein the accessible storage is arranged for configuring the IMS subscription data for the subscriber with at least one implicit registration set selected from: a set including a number 'n' of IMPIs associated with the given IMPI or with the given IMPU, and a set including a number 'm' of contact addresses per IMPI basis;

wherein the processing unit is arranged for determining whether an implicit registration set of 'n' IMPIs associated with the given IMPI or with the given IMPU, or an implicit registration set of 'm' contact addresses for the given IMPI, or both implicit registration sets are configured; and wherein the HSS also comprises a sender for downloading towards the S-CSCF said at least one implicit registration set.

11. The HSS of claim 10, wherein the implicit registration set configured at the accessible storage and determined by the processing unit is the implicit registration set of 'n' IMPIs associated with the given IMPI or with the given IMPU.

12. The HSS of claim 10, wherein the implicit registration set configured at the accessible storage and determined by the processing unit is the implicit registration set of 'm' contact addresses for the given IMPI.

13. The HSS of claim 10, wherein the accessible storage is arranged for setting a configurable parameter per IMPI basis to indicate whether or not such IMPI can be considered at the S-CSCF as implicitly registered only upon confirmation from a user equipment triggering the registration with the given IMPI and the given IMPU.

14. The HSS of claim 10, wherein the accessible storage is arranged for setting a configurable parameter per IMPI basis to indicate whether or not such IMPI can be considered at the S-CSCF as implicitly registered depending on a given contact address received at the S-CSCF along with the given IMPI and the given IMPU.

15. The HSS of claim 10, wherein the contact addresses are usable to reach at least one IMPI selected amongst the given IMPI and said set of 'n' IMPIs in a number 'm' of fix and mobile devices.

16. The HSS of claim 10, wherein the sender is arranged for downloading during the registration process said at least one selected implicit registration set towards the S-CSCF along with an Implicit Registration Set of IMPUs associated with the given IMPU.

17. The HSS of claim 10, wherein the given IMPU is a shared IMPU.

18. The HSS of claim 10, wherein:

the accessible storage is arranged for configuring at least one IMPI in the implicit registration set of 'n' IMPIs with a number of policies to be applied on how to progress the terminating call; and the processing means is arranged for determining at least one IMPI for which the policies allow to progress the terminating call to be downloaded towards the S-CSCF as the implicit registration set of IMPIs.

19. A Serving Call Session Control Function "S-CSCF" for serving subscribers of an IP Multimedia Subsystem "IMS", the S-CSCF comprising:

a sender for submitting towards a Home Subscriber Server "HSS", which holds subscriptions for subscribers of the IMS, an indication of a registration of an IMS subscriber with a given IMS public identity "IMPU" and a given IMS private identity "IMPI", and an identifier of the S-CSCF;

a receiver for receiving from the HSS at least one implicit registration set selected from: a set including a number 'n' of IMPIs associated with the given IMPI or with the given IMPU, and a set including a number 'm' of contact addresses per IMPI basis; and an accessible storage for storing: the given IMPI explicitly registered, the given IMPU explicitly registered, and the at least one implicit registration set selected from the set of 'n' IMPIs associated with the given IMPI or with the given IMPU, and the set of 'm' contact addresses per IMPI basis.

20. The S-CSCF of claim 19 wherein the receiver is arranged for receiving from the HSS an indication for at least one IMPI in the set of 'n' IMPIs to indicate that the at least one IMPI can be implicitly registered only upon confirmation from a user equipment triggering the registration with the given IMPI and the given IMPU.

21. The S-CSCF of claim 19, wherein the receiver is arranged for receiving from the HSS an indication for at least one IMPI in the set of 'n' IMPIs to indicate that the at least one IMPI can be implicitly registered depending on a given contact address received by a second receiver at the S-CSCF along with the given IMPI and the given IMPU.

22. The S-CSCF of claim 19, further comprising a second sender arranged for using the contact addresses to reach at least one IMPI selected amongst the given IMPI and said set of 'n' IMPIs in a number 'm' of fix and mobile devices.

23. The S-CSCF of claim 22, further comprising a processing unit arranged for instructing the second sender to submit a message addressing the at least one IMPI selected amongst the given IMPI and said set of 'n' IMPIs towards a number 'm' of fix and mobile devices identified by the 'm' contact addresses received from the HSS.

24. A computer program, loadable into an internal memory of a computer with input and output units as well as with a processing unit, the computer program comprising encoded instructions stored on non-transitory media and which, when executed by the computer perform acts of claim 1.

25. The computer program of claim 24, wherein the encoded instructions when executed by the computer perform the acts of:

configuring at the HSS at least one IMPI in the implicit registration set of 'n' IMPIs with a number of policies to be applied on how to progress the terminating call; and determining at the HSS at least one IMPI for which the policies allow to progress the terminating call to be downloaded towards the S-CSCF as the implicit registration set of IMPIs.

* * * * *

UNITED STATES PATENT AND TRADEMARK OFFICE
CERTIFICATE OF CORRECTION

PATENT NO. : 8,422,488 B2
APPLICATION NO. : 13/001505
DATED : April 16, 2013
INVENTOR(S) : Belinchon Vergara et al.

Page 1 of 2

It is certified that error appears in the above-identified patent and that said Letters Patent is hereby corrected as shown below:

In the Specification

In Column 1, Line 5, below Title,
insert -- This application is the U.S. national phase of International Application No. PCT/EP2008/058267, filed Jun. 27, 2008, which designated the U.S., the entire contents of which is hereby incorporated by reference. --.

In Column 6, Line 22, delete "number of" and insert -- number 'm' of --, therefor.

In Column 7, Line 28, delete "number of" and insert -- number 'm' of --, therefor.

In Column 8, Line 34, delete "101 103 105," and insert -- 101, 103, 105, --, therefor.

In Column 8, Line 35, delete "103 105," and insert -- 103, 105, --, therefor.

In Column 9, Line 6, delete "IMPIs" and insert -- IMPUs --, therefor.

In Column 11, Line 6, delete "IMPIs is" and insert -- IMPIs --, therefor.

In Column 11, Line 7, delete "156 158 160," and insert -- 156, 158, 160, --, therefor.

In Column 11, Line 8, delete "158 160," and insert -- 158, 160, --, therefor.

In Column 12, Line 30, delete "IMPIs;" and insert -- IMPUs; --, therefor.

In Column 12, Line 34, delete "IMPUs" and insert -- IMPUs; --, therefor.

In Column 13, Line 21, delete "IMP" and insert -- IMPI --, therefor.

Signed and Sealed this
Twenty-second Day of October, 2013

Teresa Stanek Rea
*Deputy Director of the United States Patent and Trademark Office*

CERTIFICATE OF CORRECTION (continued)
U.S. Pat. No. 8,422,488 B2

In Column 13, Line 43, delete "number of" and insert -- number 'm' of --, therefor.

In Column 13, Line 63, delete "103 108," and insert -- 103, 108, --, therefor.

In Column 14, Line 56, delete "number of" and insert -- number 'm' of --, therefor.

In Column 15, Line 17, delete "number" and insert -- number 'm' --, therefor.

In the Claims

In Column 17, Line 53, in Claim 1, delete ""MSS"," and insert -- "HSS", --, therefor.

In Column 20, Line 13, in Claim 19, delete "from" and insert -- from: --, therefor.

In Column 20, Line 17, in Claim 20, delete "claim 19" and insert -- claim 19, --, therefor.